PILOT OPERATED CONTROL VALVE MECHANISM

Original Filed May 16, 1963 6 Sheets-Sheet 1

Inventor
Francis H. Tennis
By Dwa Mullen Jones
Attorney

PILOT OPERATED CONTROL VALVE MECHANISM

Original Filed May 16, 1963 6 Sheets-Sheet 2

Inventor
Francis H. Tennis
By Lee Milton Jones
Attorney

PILOT OPERATED CONTROL VALVE MECHANISM

Original Filed May 16, 1963 6 Sheets-Sheet 3

Inventor
Francis H. Tennis
By Dreyfus & Jones
Attorney

PILOT OPERATED CONTROL VALVE MECHANISM

Original Filed May 16, 1963 6 Sheets-Sheet 4

PILOT OPERATED CONTROL VALVE MECHANISM

Original Filed May 16, 1963 6 Sheets-Sheet 5

PILOT OPERATED CONTROL VALVE MECHANISM

Original Filed May 16, 1963 6 Sheets-Sheet 6

Inventor
Francis H. Tennis
By Inskeep & Jones
Attorney

United States Patent Office

Re. 26,028
Reissued May 17, 1966

26,028
PILOT OPERATED CONTROL VALVE MECHANISM

Francis H. Tennis, Hartland, Wis., assignor to Hydraulic Unit Specialties Company, Pewaukee, Wis., a corporation of Wisconsin Original No. 3,151,455, dated Oct. 6, 1964, Ser. No. 280,901, May 16, 1963. Application for reissue Oct. 23, 1965, Ser. No. 506,145
38 Claims. (Cl. 60—52)

Matter enclosed in heavy brackets [ ] appears in the original patent but forms no part of this reissue specification; matter printed in italics indicates the additions made by reissue.

This invention relates generally to fluid pressure operated systems, and has more particular reference to improvements in control valve mechanisms for such systems.

In the past, fluid motors, including hydraulic cylinders, have been governed by control valves that generally comprise a spool valve element shiftable in a bore in the body of the valve from a neutral or hold position to one or more operating positions to govern the flow of pressure fluid to and from the motor. Typical control valves of this nature are disclosed in Patent No. 2,873,762 issued to Francis H. Tennis on February 17, 1959.

It is well known that the size of a control valve such as herein concerned, bears a direct relationship to the capacity at which the valve is rated. Thus, a control valve capable of handling large volumes of fluid per unit of time must be made substantially bigger than those of smaller capacity.

Considerable difficulty has been experienced in the past with control valves in the larger sizes having high rated capacities. In such larger size control valves, exceedingly close tolerances had to be adhered to in the manufacture of their working parts in order to make the valve mechanism as leakproof as possible. Due to this requisite, and because of the tendency of the valve bodies to flex slightly under high fluid pressure forces in its internal passages, the spools of such valves exhibited a pronounced tendency to stick or bind, thus making it exceedingly difficult to shift them from one operating position to another.

In addition, there was always danger that the spools of such valves and/or the bodies in which they operated, might warp slightly and make it nearly impossible to shift the spools from one position to another.

With these objections in mind, it is the primary purpose of this invention to provide control valve mechanism which features what might be termed finger tip and precise control of a fluid motor regardless of the rated capacity of the valve mechanism.

More particularly, it is an objective of this invention to provide control valve mechanism wherein high pressures and volumes of fluid can be handled without the necessity for adhering to unusually close tolerances in the working parts of the mechanism, and wherein simple and inexpensive O ring type seals around the moving part of certain of the components of the mechanism positively preclude leakage of fluid from said components and enable them to be made of light weight metals such as aluminum.

In a still more specific sense, it is a purpose of this invention to provide control valve mechanism for fluid pressure operated systems, by which large volumes of fluid at high pressure may be routed to and from a fluid motor at the dictation of a compact and easily operated master control or pilot valve device and which also enables the speed at which the motor is operated to be accurately controlled.

Another object of the invention resides in the provision of control valve mechanism of the character described, which incorporates fluid distributing valve mechanism that may be constructed as a component separate from the master control unit and thus mounted on fluid pressure operated apparatus at a location remote from the master control unit.

Still another purpose of the invention is to provide control value mechanism of the character described, wherein the rated capacity of the mechanism is determined by the size of the distributing valve unit, to thus enable the same small and easily operated master control unit to be used with distributing valve units having widely differing flow capacities.

With these and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which.

Figure 1:
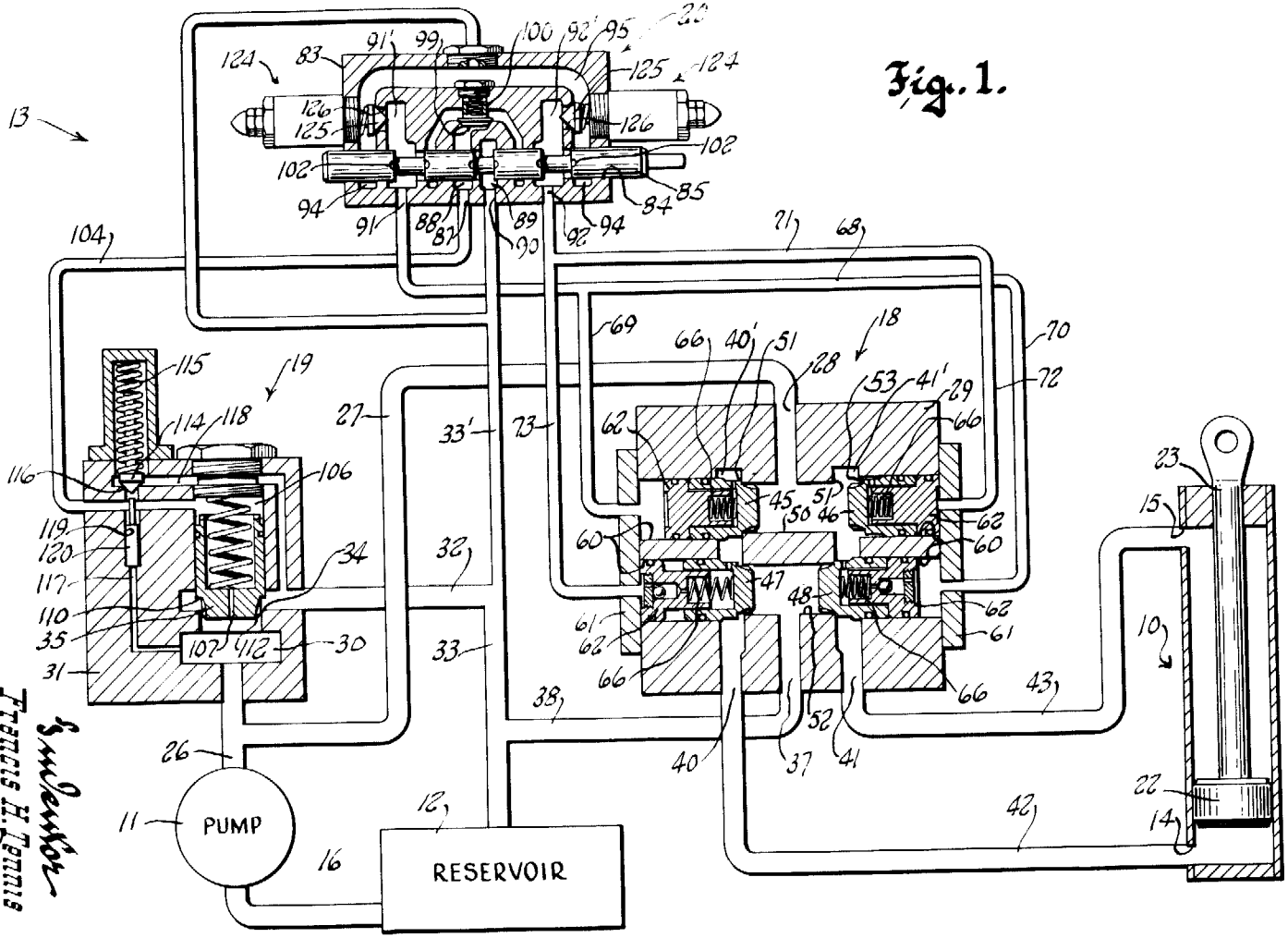
FIGURE 1 is a more or less diagrammatic view illustrating a control valve mechanism of this invention embodied in a fluid pressure operated system comprising a reversible fluid motor.

Referring now more particularly to the accompanying drawings, wherein like reference characters have been applied to like parts throughout the views, the numeral 10 in FIGURE 1 designates a double acting hydraulic cylinder, or reversible fluid motor, which has been illustrated as comprising a part of a fluid pressure operated system that includes a pump 11, a reservoir 12 to contain fluid and from which the pump is fed, and control valve mechanism of this invention, generally designated 13, for selectively connecting either of the motor ports 14–15 with the pump and the other motor port with the reservoir. The inlet of the pump is connected with the reservoir by means of a duct 16.

The control valve mechanism 13 comprises three main components, namely: a distributing or directional control valve unit 18 through which pump output fluid is routed to the motor 10 and fluid exhausting from the motor is routed to the reservoir; a combination metering and bypass valve unit 19 that is operable to control the amount of pump output fluid routed to the motor by the directional control unit 18; and a master control or pilot valve unit 20 which governs the operation of the directional control unit 18 and the combination metering and bypass valve unit 19.

The master control or pilot valve unit 20, which can be operated either manually or automatically, cooperates with the other two control units 18 and 19 to enable an operator to manually select both the direction and the speed of travel of the piston 22 in the hydraulic cylinder 10, and thus effect regulated extension and/or retraction of its work performing element 23 and corresponding movement of a work load that may be connected thereto.

The outlet 26 of the pump is at all times in communication with a main supply line 27 that connects with an inlet 28 in the body 29 of the directional control unit 18, and it also connects with an inlet chamber 30 in the body 31 of the metering valve unit 19. The inlet chamber 30 in the unit 19 is at all times connected with the inlet of the pilot valve unit 20 (in a manner to be described later), and the chamber 30 is also communicable with the reservoir at certain times through a bypass duct 32 that connects at one end with a reservoir line 33 and at its other end with the chamber 30 through an annular upwardly facing valve seat 34 formed in the body of the unit 19, coaxial with the inlet chamber 30 thereof.

The inlet chamber 30 and the duct 32 with which it communicates provides a bypass through which pump output fluid can be returned to the reservoir in bypass relation to the main supply line 27, providing the seat 34 is open. This bypass is controlled by a pressure responsive metering valve member 35 which is movable from a bypass closed position engaging seat 34, to any of a number of metering positions allowing different amounts of pump output fluid to bypass the main supply line 27.

The inlet 28 of the distributing or directional control valve unit 18 is shown opening to the top of its body 29, and it has an outlet 37 that opens from its bottom and communicates with the reservoir by means of a main return line 38 that connects with the reservoir line 33. A pair of service ports 40 and 41 open to the bottom of the body 29 at opposite sides of the outlet 37. A duct 42 connects service port 40 with motor port 14, and a similar duct 43 connects service port 41 with the other motor port 15.

Hence it will be seen that the inlet port 28 of the directional control valve unit must be selectively connectible with either service port 40 or 41 in order to supply pressure fluid into one end or the other of the hydraulic cylinder 10, and also that the outlet 37 must be selectively connectible with either service port so that fluid exhausting from one end or the other of the hydraulic cylinder can be conducted to the reservoir.

For this purpose, the directional control unit 18 incorporates a pair of opposed supply check valves 45 and 46 to respectively govern communication between the inlet 28 of the unit and its service ports 40 and 41; and it further incorporates a pair of opposed exhaust check valves 47 and 48 to respectively govern communication between the outlet 37 of the unit and its service ports 40 and 41.

The supply checks 45 and 46 are located at the opposite ends of a short central horizontally disposed upper bore 50 in the body 29, into the medial portion of which the inlet 28 opens. They are engageable with annular outwardly facing valve seats 51 on the body 29 formed at the zones where the opposite ends of the bore communicate with passages 40' and 41' in the body that may constitute upward extensions of the service ports 40 and 41, respectively.

The outlook checks are similarly located at the opposite ends of a short lower bore 52 parallel to the first but having its medial portion communicating with the outlet 37 of the valve body. The outlet checks are engageable with outwardly facing annular valve seats 53 on the body at the junction between the ends of the bore 52 with the upwardly extending passages 40' and 41'.

With the arrangements described, the passages 40'–41' and the ducts 42–43 can be considered branches of the main supply line 27, while the ducts 42–43 and the lower end portions of passages 40'–41' can be considered branches of the return line 38.

The supply and return checks have small diameter inner end portions 55 of a size to enter the adjacent ends of their respective bores 50–52 when the valves are closed, and integral tubular outer portions 56 of larger diameter that are turned down to an intermediate diameter as at 57, adjacent to their junctions with the small diameter inner end portions. This defines annular inwardly facing shoulders 58 on the supply and return checks that engage the valve seats 51 and 53 to enable the supply checks to close off communication between the inlet 28 and either passage 40'–41' and to enable the return checks to block communication between the last named passages and the outlet 37.

Counterbores 60 that open inwardly to the passages 40'–41' and are coaxial with the bores 50 and 52 slidably receive the tubular outer end portions 56 of the supply and exhaust checks. These counterbores are closed by plates 61 secured to the opposite sides of the body 29, and define pressure chambers or cylinders in which piston-like actuators 62 are slidably received and which are operable to hold their respective check valves on their seats whenever the chambers are pressurized. O-ring seals 63 confined in circumferential grooves around the tubular rear portions of the check valves and their piston-like actuators slidingly but sealingly engage the walls of the counterbores 60 to prevent fluid from leaking past the check valves and their actuators.

Since the O-rings positively seal the moving parts of the directional control valve unit, there is no need to hold to such close tolerances as are required, for example, in conventional control valves having a shiftable spool valve element, where the close fit of the spool in its bore is relied upon to prevent leakage of hydraulic fluid past the lands of the spool. It will also be appreciated that this use of O-ring seals practically eliminates wear on the surfaces of the bores containing the valve elements and their actuators, so that the body of the valve unit no longer need be made of iron or steel having good wearing qualities but great weight. Instead, lightweight metals such as aluminum can be used for the first time in a control valve for hydraulic systems operated at high pressures.

Each piston-like actuator has a reduced inner portion 65 that is slidingly telescoped within the tubular outer portion 56 of its check valve. A compression spring 66 bearing against the inside of the front portion of each check valve and the bottom of a well in the reduced inner portion of its piston-like actuator at all times tends to axially separate the check valve from its actuator.

With the check valve mechanism described, it will be apparent that supply check 45 can open in response to the pressure of fluid in bore 50, whenever its pressure chamber 60 is vented, to allow pressure fluid in the main supply line to flow to the bottom motor port 14 via duct 42 and passage 40' in the body 29 of the directional control unit. It will also be apparent that whenever pressure fluid is supplied to the motor port 14 in this manner, motor port 15 must be communicated with the reservoir 12. This, of course, requires opening of exhaust check 48 to establish communication between the return outlet 37 and service port 41 which is connected to motor port 15 by duct 43.

Consequently, the check valve 45 constitutes a supply check for motor port 14 while check valve 48 constitutes an exhaust check for motor port 15. Similarly, supply check 46 serves as a supply valve for motor port 15 and pairs with exhaust check 47, which serves motor port 14, to effect operation of the motor in the opposite direction. Thus, it follows that if the piston of cylinder 10 is to be driven downwardly, as is the case in FIGURE 1, the pressure chambers of supply check 46 and exhaust check 47 must be vented while the pressure chambers of supply check 45 and exhaust check 48 must be pressurized to cause the two last named check valves to be held in their seated positions by their piston-like actuators. Conversely, if the piston in cylinder 10 is to be driven upwardly, the supply and exhaust checks must be in their positions seen in FIGURE 4, where checks 45 and 48 are open, and checks 46 and 47 are held seated.

A control duct 68 having branches 69 and 70 respectively communicating with the pressure chambers 60 of supply check 45 and exhaust check 48 provides for opening and closing of said checks in unison; while a similar control duct 71 having branches 72 and 73 respectively communicating with the pressure chambers of supply check 46 and exhaust check 47 provides for concurrent opening and/or closing of the latter valves.

Figure 4:
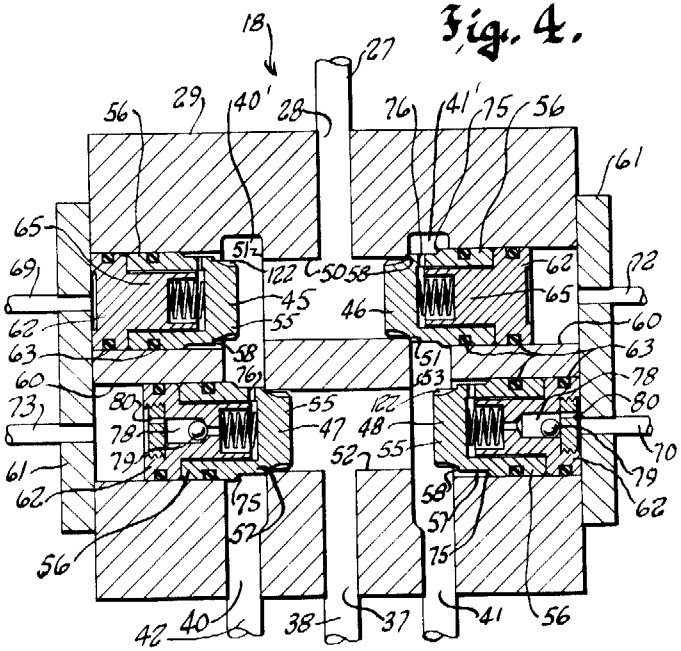
FIGURE 4 is an enlarged sectional view of the distributing or directional control unit shown in FIGURE 1, but having its working parts in different positions.

As seen best in FIGURE 4, it will be noted that each of the check valves has an inwardly facing circumferential shoulder 75 formed thereon at the junction between its large and intermediate diameter portions 56 and 57. These shoulders are important in the case of the exhaust checks 47 and 48 since they provide for opening of the exhaust check valves, in consequence of the force which fluid exhausting from one end or the other of a hydraulic cylinder imposes upon them, at times when the pressure chambers associated with the exhaust checks are vented.

In addition, each of the check valves has a small diameter radial port 76 in its intermediate portion 57, opening to the hollow interior of the check valve, and which at all times communicates with the adjacent upright passage 40' or 41' in the valve body. These ports not only allow fluid to be expelled from the interiors of the check valves to one or the other of the passages 40'–41' during relative movement of the check valves and their piston actuators toward one another, but in the case of the exhaust checks, the ports 76 allow exhaust fluid to flow outwardly through the actuators and pressure chambers to the control duct branches 70 and 73.

For this purpose, the piston-like actuators for the exhaust checks 47 and 48 are not solid as they are for the inlet checks 45 and 46, but have axial passages 78 extending entirely therethrough. All portions of the passages 78 are larger in diameter than the radial ports 76 in their respective exhaust check valves. The inner end of the passage 78 in each exhaust check actuator leads to the hollow interior of its check valve through an outwardly facing conical valve seat that is engageable by a ball check 79 in consequence of the flow of pressure fluid into its associated pressure chamber 60 to prevent such fluid from escaping to the passage 40' or 41' through the radial port 76 in its check valve. The ball checks 79, of course, do not prevent fluid flow outwardly from the interiors of the exhaust checks, through the passages 78 in their piston actuators.

Each of the ball checks 79 is movable back and forth in an enlarged medial portion of its passage 78, and each of the passages communicates with the pressure chamber behind the actuator through a hole 80 which is eccentric with respect to the axis of the chamber so that it cannot be closed by its associated ball check.

From the description thus far, it will be seen that the supply checks 45 and 46 are operable to control communication between the main supply line 27 and either motor port 14–15, and that the metering valve member 35 is operable to regulate the amount of pump output fluid flowing to either motor port through the main supply line. Similarly, it will be seen that the exhaust checks 47–48 are operable to control communication between either motor port 14–15 and the main return line 38.

In accordance with this invention, the operation of the metering valve member 35 as well as that of the supply and exhaust checks 45–46–47–48, is governed by the master control or pilot valve unit 20. Generally speaking, the master control unit 20 is operable to selectively direct pressure fluid or to effect the exhaust of pressure fluid from the pressure chambers 60 of the directional control valve unit 18; and it is also operable to effect application of fluid pressure forces of varying magnitudes upon the metering valve member 35 to cause the same to assume either fully closed or fully opened positions, or any of a number of intermediate metering positions allowing different amounts of pump output fluid to bypass the main supply line 27.

The master control or pilot 20 comprises a valve body 83 having a bore 84 to receive a small diameter endwise movable spool or valve element 85 which can be shifted from one position to another by an operator of the system with very little effort.

The pilot valve unit 20 is similar to the control valves of the aforesaid Tennis Patent No. 2,873,762, both in construction and operation, and differs therefrom primarily in that since it is never concerned with flow rates, it can always be made very small and compact. By way of example, the control spool 85 of the pilot valve need have a diameter but very little greater than that of an ordinary lead pencil. Because of its small size, it also lends itself to remotely controlled automatic operation, as for example, by electromagnetic actuators connected with the spool.

As is typical of control valves of this nature intended for the control of a double acting hydraulic cylinder, the spool 85 has three axially spaced circumferential grooves therein, and it is adapted to be shifted from a neutral or cylinder hold position to either of two operating positions at opposite sides of its neutral position, to effect reversal of the operation of a hydraulic cylinder governed thereby.

The pilot valve is preferably of the open center type having an inlet 87 connecting with an upstream branch 88 of a through passage in the body of the valve, and an outlet 89 that connects with the downstream branch 90 of the through passage. As is customary in valves of this type, the two branches of the through passage are communicated with one another by the bore 84 through the central groove in the control spool 85 when the latter is in its neutral position.

Thus, pump output fluid may flow uninterruptedly from the inlet 87 to the outlet 89 via the through passage branches 88 and 90 whenever the control spool 85 is in its neutral position.

The body 83 of the pilot valve unit is also provided with a pair of control ports 91 and 92 that open from service passages 91' and 92', respectively, that intersect the bore 84 at locations adjacent to the endmost circumferential grooves in the control spool. The service passages are located inwardly adjacent to the opposite branches 94 of an inverted U-shaped exhaust passage 95 in the body, and outwardly adjacent to the opposite branches 96 of a U-shaped bridge passage 97 that is communicated with the upstream branch 88 of the through passage through a check valve controlled port 99. Since the branches of the bridge and exhaust passages all intersect the bore 84, either service passage 91'–92' can be selectively communicated with either the exhaust passage or the bridge passage through the bore 84 and the end grooves in the control spool, or both service passages can be isolated from the bridge and exhaust passages in the neutral position of the control spool.

Figure 2:
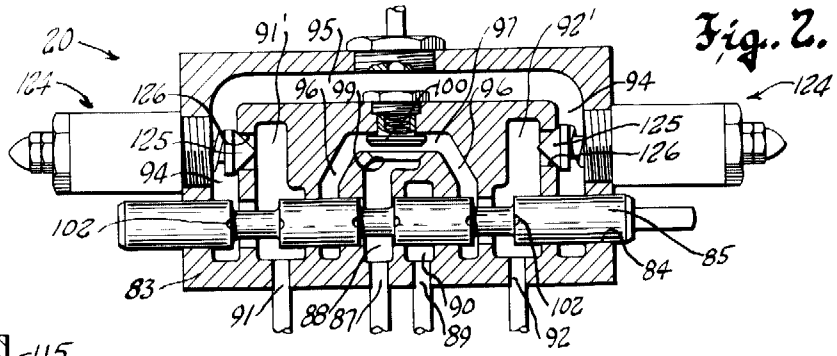
FIGURE 2 is an enlarged sectional view of the master valve unit shown in FIGURE 1, but illustrating the same in another control position.

In FIGURE 2, the pilot control spool has been shown shifted out of its neutral position to a left hand operating position at which it blocks fluid flow from the inlet branch 88 of the through passage to the outlet branch 90 thereof, causing pressure fluid entering the inlet 87 to unseat the check valve 100 that normally closes the port 99. Such pressure fluid thus flows into the bridge passage 97 and through the bore 84 and right hand groove in the control spool to the control port 92. Since control port 92 is connected with the control line 71, pressure fluid flows through the branches 72 and 73 of the control line to the pressure chambers 60 of supply check 46 and exhaust check 47 to effect closure thereof by their respective piston actuators 62. At the same time, the service passage 91' and its associated control port 91 are communicated with the adjacent branch 94 of the exhaust passage 95, so that fluid can be exhausted from the pressure chambers 60 of supply check 45 and exhaust check 48 through the branches 69 and 70 of control line 68, which connects with control port 91 of the pilot unit. This, of course, vents the pressure chambers of checks 45 and 48 and allows the latter to open.

FIGURE 4 shows the positions of the supply and exhaust checks in the directional control unit that obtain when the pilot control spool is shifted to its position shown in FIGURE 2; and it will be appreciated that the positions of the supply and exhaust checks will be reversed in consequence of shifting of the pilot control spool to its other operating position, indicated in FIGURE 1, to the right of neutral.

Metering notches 102 of a conventional type are formed in the axial ends of the lands that are defined by the three axially spaced grooves in the control spool to not only provide for metered flow of pressure fluid from the inlet 87 to the outlet 89 via the through passage branches 88 and 90 and bore 84, but to also provide for metered flow of return fluid from either control port 91–92 to the exhaust passage 95 in the pilot valve. FIGURE 1 shows the control spool 85 in such a metering position limiting flow through the through passage of the pilot valve, and limiting flow of return fluid, entering control port 92, to the adjacent branch 94 of the exhaust passage 95.

Pressure fluid that is allowed to flow through the through passage in the pilot valve unit in the neutral position of its spool issues from the outlet 89 and is returned to the reservoir through a branch 33' of the reservoir line. Pump output fluid is supplied to the pilot valve unit for selective distribution thereby to the pressure chambers 60 of the directional control valve unit 18, by means comprising a duct 104 having one end connected to the inlet 87 of the pilot unit, and its other end is communicated with the inlet chamber 30 in the body 31 of the metering valve unit 19. The duct 104 is communicated with the chamber 30 through the interior of the metering valve member. It is here shown as connected with the outer end of a passage 105 in the body 31 of the metering valve unit. This passage leads into the upper end portion of a bore 106 which is coaxial with and opens downwardly to the valve seat 34, and in which bore the check or metering valve member 35 is slidably received and guided for up and down motion toward and from engagement with its seat 34. The metering valve member 35 is of hollow, cup-like construction having a bottom with a small diameter passage 107 drilled therethrough to communicate the hollow interior of the valve member with the inlet chamber 30. Hence, pump output fluid can flow through the passage 107 and the hollow interior of the metering valve member 35 to the passage 105, and through the duct 104 to the inlet 87 of the pilot unit 20.

The outer end of the bore 106 is closed by a plug 107, and a compression spring 108, which extends into the hollow interior of the cup-like metering valve member, is confined between the bottom of the latter and the plug to yieldingly bias the valve member onto its seat 34. In its seated position shown in FIGURE 3, a reduced nose 109 on the bottom of the valve member loosely projects downwardly through the seat 34 and the latter is engaged by the circumferential shoulder 110 on the exterior of the valve member, formed at the junction between the nose 109 and the larger diameter cylindrical side wall of the valve member.

When the spool valve element 85 of the pilot valve is in its neutral position, pump output fluid delivered to its inlet 87 can flow to its outlet 89 via the then communicated branches 88 and 90 of the open center or through passage, and return to the reservoir through ducts 33 and 33'. This circuit forms a second bypass path for pump output fluid, through which a small amount of "control" fluid can flow when the control spool 85 of the pilot unit is in its neutral position. When such flow of "control" fluid is unrestricted, the absence of back pressure in the pressure chamber provided by the bore 106 in the metering valve unit 19 allows the biasing force of the spring 108 to be overcome by the force which pump output fluid in the inlet chamber 30 exerts on the nose of the metering valve member 35, and it is lifted upwardly off of its seat 34 by said force to fully communicate the outlet 26 of the pump with the bypass duct 32. At such a time, therefore, pump output fluid bypasses the directional control unit 18, and no pressure fluid can be supplied to the cylinder 10.

Figure 3:
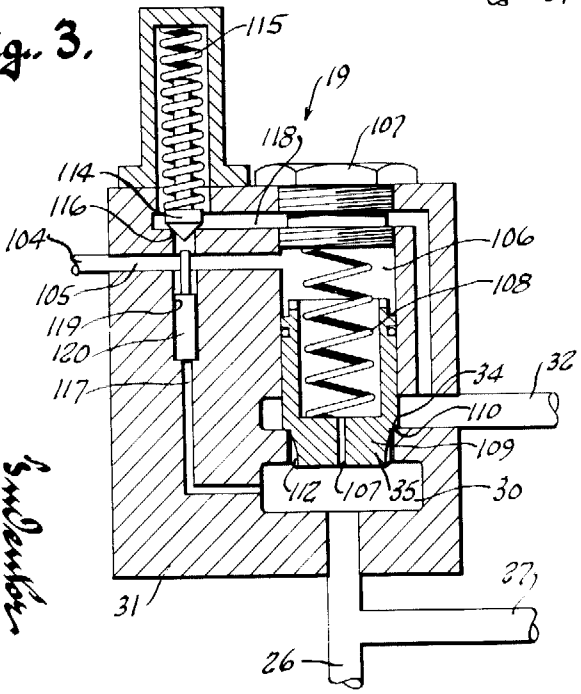
FIGURE 3 is an enlarged sectional view of the metering valve unit seen in FIGURE 1, but illustrating another position thereof.

When fluid flow from the inlet to the outlet of the pilot valve unit is blocked, as is the case when the control spool 85 of the pilot valve is shifted to its operating position seen in FIGURE 2, the back pressure that builds up in the duct 104 and pressure chamber 106 exerts a closing force on the metering valve member 35 to hold it seated, as seen in FIGURE 3, to thus block bypass of pump output fluid through the duct 32 and constrain substantially all of the fluid issuing from the outlet of the pump to flow into the main supply line 27.

It will be appreciated that although the opposing fluid pressure forces that are imposed upon the metering valve member are derived from the same pressure source, namely the pump 11, the surfaces of the valve member that face upwardly toward its pressure chamber 106 have a greater total area than that of the downwardly facing surface on its reduced nose 109, so as to assure closure of the metering valve member whenever the control spool 85 of the pilot blocks the open center passage in the pilot valve body. The spring 108, of course, helps to close the metering valve member against the opening force which pressure fluid in the inlet chamber 30 imposes on the nose 109 of the valve member.

FIGURE 1 illustrates a partly open position of the metering valve member at which the forces exerted upon its nose by pump fluid entering the inlet chamber 30 hold it partly off its seat, in opposition to the force which somewhat reduced back pressure in chamber 106 exerts thereon at times when the control spool 85 of the pilot is in a position metering fluid flow through the open center passage of the pilot valve. When such a condition obtains, metering slits 112 in the nose of the metering valve member, all around its reduced extremity, allow a precisely metered flow of pump output fluid through the bypass line 32 to the reservoir, and a greater proportion of pump fluid to flow to the hydraulic cylinder through the main supply line 27.

With the construction described, it will be seen that the amount of pump output fluid that is caused to flow into the main supply line 27 will be directly proportional to the degree that the valve spool 85 of the pilot valve unit 20 obstructs the flow of fluid through the open center passage 88–90 in the body of the pilot valve. If the open center passage is wide open, as it will be in the neutral position of the control valve element 85 of the pilot, no back pressure will obtain in the pressure chamber 106, and the metering valve member 35 will be moved to a full open position by the force of pump output fluid in the inlet chamber 30 of the metering unit 19. If the open center passage is fully closed by the control spool 85, the resulting back pressure in chamber 106 will hold the metering valve member tightly on its seat 34 to prevent bypass of pump output fluid to the reservoir via duct 32.

Similarly, there can be a wide number of metering positions of the valve member 35, that increase the amount of pump output fluid flowing to the bypass duct 32 and correspondingly decrease the amount of supply fluid flowing to the main supply line 27, which are achieved by manipulating the control spool 85 of the pilot to gradually let more fluid flow through the open center passage in the pilot valve body. Consequently, the speed at which the piston rod of cylinder 10 moves a load connected thereto can be very accurately controlled.

If desired, a relief valve for the system can be incorporated in the body of the metering valve unit 19 in the manner illustrated in FIGURES 1 and 3. Thus the relief valve may comprise a poppet 114 biased by a spring 115 toward engagement with an upwardly facing annular [value] *valve* seat 116 through which communication is established between a first duct 117, connecting with the inlet chamber 30, and a second duct 118 that communicates with the bypass line 32.

Near its junction with the duct 118, the duct 117 is enlarged, as at 119, to receive a plunger 120 which is responsive to the pressure of fluid in the inlet chamber 30. The plunger is moved upwardly whenever the pressure of fluid in the inlet chamber reaches an excessively high value, and pushes the relief poppet 114 to an open position disengaged from its seat 116 to thus communicate the cylinder or pressure chamber 106 with the reservoir via the duct 118 and bypass line 32. This, of course, relieves the back pressure in the chamber 106 and allows the check [value] *valve* to be moved to its fully open position by the force of pump output fluid entering the inlet chamber 30, thereby effectively unloading the pump.

Attention is directed to the fact that while the metering valve 35 cooperates with the supply checks 45 and 46 of the directional control valve unit 18, at the dictate of the pilot valve unit 20, to effect metering of the amount of pump output fluid supplied to either port of the hydraulic cylinder 10, the exhaust checks 47 and 48 cooperate with the control spool of the pilot valve to govern the rate at [whtich] *which* fluid can be exhausted from the other port of the motor. FIGURE 1 shows the exhaust check 47 in a partly open position at which it meters the flow of fluid exhausting from the lower motor port 14 to the reservoir. Such metering is effected by reason of the fact that the notches 102 in the pilot spool 85, in its position shown in FIGURE 1, afford only limited communication between the pressure chamber 60 of exhaust check 47 and the exhaust passage 95 in the body of the pilot valve. Hence, the pressure in chamber 60 behind the piston actuator of exhaust check 47 is only slightly relieved to allow the check 47 to open the small amount necessary to permit fluid under pressure exhausting from the motor to flow through metering slits 122 in the exterior of its reduced inner portion 55 in order to reach the outlet 37. At the same time, fluid flows through the port 76 in the side of exhaust check 47 into its pressure chamber 60. Inasmuch as exhaust fluid in passage 40' at this time can flow into pressure chamber 60 substantially as fast as it can flow therefrom to the exhaust passage 95 in the pilot valve through the metering notches 102 in the control spool 85, exhaust check 47 cannot open fully; and its partly open position will be determined by the metering position of the control spool and specifically by the rate at which exhaust fluid can flow through its pressure chamber 60 to the exhaust passage 95 in the pilot valve 20.

Exhaust check 48 also has metering slits 122 in the exterior of its reduced inner end, and it functions in the same way as the check 47 to meter the exhaust of motor fluid through passage 41' when the control spool 85 is shifted to a metering position to the left of its neutral position, somewhat short of its "full speed" position seen in FIGURE 2.

If desired, cylinder port relief valve mechanisms 124 can be incorporated anywhere in the conduit means or passages in the mechanism that connect with the pilot control ports 91–92 or service ports 40–41, to relieve excessively high pressure conditions that may be manifested in the cylinder 10 by the nature of the load to which its piston rod is connected. By way of example, such cylinder port relief valve mechanisms could be located in the body of the directional control valve to be sensitive to the pressure of fluid either in the chambers 60 of the exhaust check valves or at the ports 40–41. However, they have here been illustrated as incorporated in the pilot valve mechanism 20, and they may comprise spring biased poppet valves 125 which are at all times urged toward closed positions blocking passages 126 in the body of the pilot valve that communicate the branches of the exhaust passage 95 with their adjacent service passages 91' and 92'.

Whenever the pressure of fluid supplied to either end of the hydraulic cylinder rises to an excessively high value, correspondingly high pressures will obtain in one or the other of the service passages 91'–92', and fluid pressure forces exerted on the associated relief poppet 125 will unseat the same. If this should occur, for example, at a time when the pilot spool 85 is in the left hand "full speed" operating position seen in FIGURE 2, at which the metering valve 35 is closed and supply check 46 and exhaust check 47 are positively held upon their seats, excessive-high pressure in the lower end of the cylinder 10 will be mirrored in service passage 92', and the resulting opening of its associated relief poppet 125 effects venting of the pressure chambers of the supply check 46 and the exhaust check 47. The supply check 46 will then move slightly off of its seat in response to the pressure of fluid in the bore 50, thus allowing pressure fluid entering the inlet port 28 of the directional control unit to flow to the exhaust outlet 37 via passage 41'. Exhaust check 47 also is caused to move slightly off of its seat at this time in consequence of the force that pressure fluid in the passage 40' exerts upon the shoulder 75 thereof, to also communicate the lower motor port 14 with the exhaust outlet 37. Consequently, excessive cylinder port pressure is substantially instantaneously relieved, whereupon the cylinder port relief valve poppet can return to its normally closed position.

One of the outstanding features of the control valve mechanism described is that its components can be embodied in separate housings, as shown, or they may be incorporated in a single housing if desired. Unusual flexibility in the placement of the components on hydraulic apparatus to be controlled is possible, of course, when the units are separately housed as shown.

It is also a highly important feature of this invention that the directional control valve mechanism 18 can be made to handle any required pressure and volume of fluid, without in anywise requiring a corresponding increase in size in the pilot valve mechanism 20. Hence, the latter always may be made in unusually and exceptionally compact form.

Figure 5:
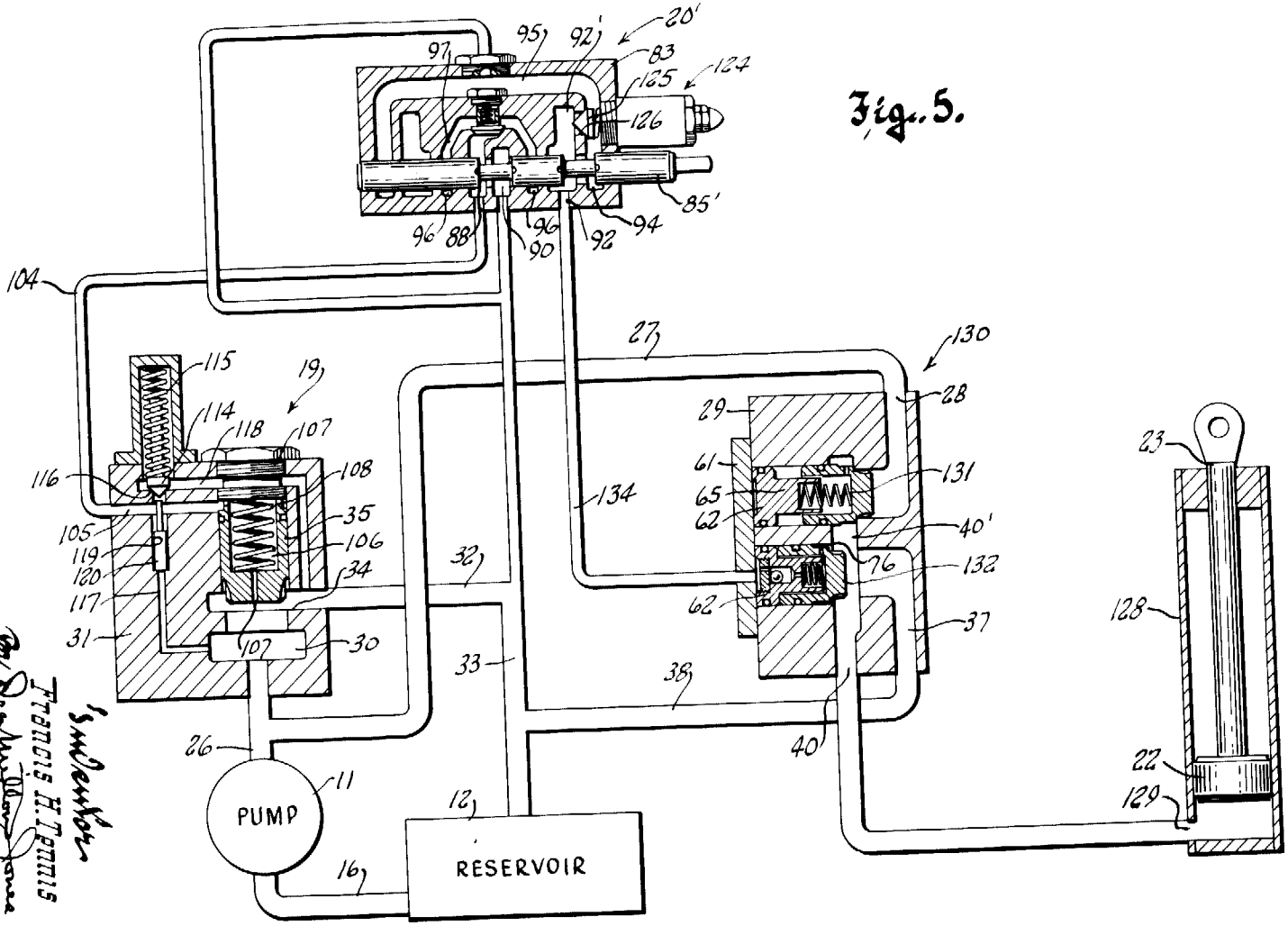
FIGURE 5 is a more or less diagrammatic view of a control valve mechanism of this invention adapted for the control of a fluid pressure system which comprises a single acting hydraulic cylinder.

FIGURE 5 illustrates how pilot operated control valve mechanism of this invention can be used to advantage for the control of a single acting hydraulic cylinder. In this case, since the cylinder 128 has but a single motor port 129 (at its bottom), the directional control valve unit generally designated 130 need only comprise a single supply check valve 131 and but one exhaust check valve 132. In fact, the supply check valve 131 can, in this instance, be provided by a more or less conventional check valve since it never needs to be positively held on its seat.

In this case, the pilot valve unit 20' will have a control spool 85' of the single acting type disclosed in the aforesaid Tennis Patent No. 2,873,762, having only one end groove, shown at the right hand end portion of the spool, and accordingly, the left hand control port is ordinarily plugged. No cylinder port relief valve 124, of course, will then be needed at the left hand side of the pilot valve.

While the metering valve unit 19 may be identical to that previously described, the control spool 85' of the pilot valve unit is so formed (with a wider centrally located groove) that it is capable of closing off communication between the branches 88 and 90 of its open center passage only when it is shifted to a "raise" position to the left of its neutral position. This leaves the through or open center passage open whenever the control spool is shifted to its "lower" position seen in FIGURE 5, effecting free exhaust of fluid from the single port of the cylinder 128. Consequently, in the "lower" position of the control spool 85' seen in FIGURE 5, there is no back pressure available to hold the metering valve 35 closed, and it is held in a wide open position by the force of pump output fluid acting upon its reduced lower end portion, allowing pump output fluid to bypass the main supply line and flow through the bypass line 32 to the reservoir.

It will be appreciated, therefore, that since no pump output fluid can flow to the inlet 28 of the directional control unit 130 at times when the pilot control spool is in its "lower" position illustrated, the supply check need never be positively held on its [heat] *seat*. For this reason, its pressure chamber is not connected with the pilot valve.

The pressure chamber for the exhaust check 132, however, is communicated with the single control port 92 of the pilot valve by a duct 134, as before, to enable the exhaust check valve to be firmly held seated by its piston-like actuator 62 at times when supply fluid is caused to flow to the inlet 28 of the control unit 130, past the supply check 131, to the single port of the motor. This occurs, of course, when the control spool 85' of the pilot valve is shifted to its "raise" position, to the left of neutral, and in which position the open center passage in the pilot valve is blocked, or partly blocked, and the right hand groove in the control spool communicates the bridge passage 97 with the service passage 92'.

As before, the flow of pump output fluid through the main supply line 27 to the motor port 129 of the hydraulic cylinder can be metered by so adjusting the position of the pilot control spool 85' as to restrict the flow of pump fluid through the branches 88 and 90 of the open center passage in the body of the pilot valve. This, of course, causes back pressure to be built up in the duct 104 and chamber 106 causing the metering valve 35 to assume a partly open position at which part of the output of the pump is returned to the reservoir while another part of its output flows through the main supply line 27 to the hydraulic cylinder.

Controlled descent of the piston in the hydraulic cylinder 128 can be achieved in a manner similar to that described previously, by adjusting the pilot control spool 85' to a metering "lower" position restricting communication between the pressure chamber of exhaust check 132 and the exhaust passage 95 in the pilot valve. In such a case, exhaust fluid in the passage 40' of the directional control unit 130 enters the interior of the supply check 131 through the small port 76 in its side, and exerts a force on the outwardly facing surfaces thereof to hold the supply check seated.

Figure 6:
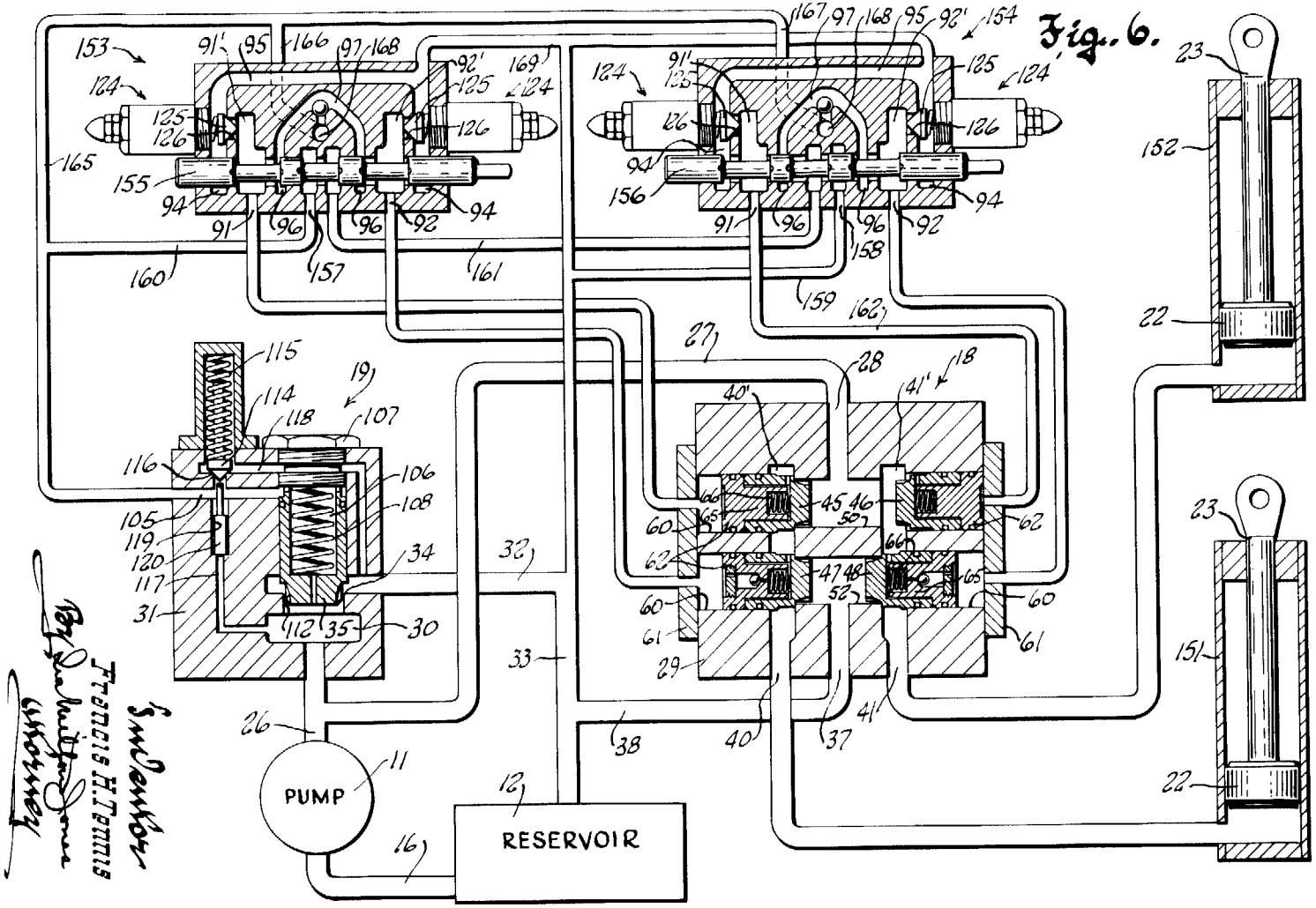
FIGURE 6 is a more or less diagrammatic view of the control valve mechanism of this invention incorporated in a fluid pressure operated system which comprises a pair of single acting hydraulic cylinders.

FIGURE 6 illustrates how a directional control valve mechanism 18 such as that first described can be employed to control a pair of single acting hydraulic cylinders 151 and 152, respectively, at the dictation of pilot valve units 153 and 154 for the cylinders. The same metering valve unit 19 is again employed in the system for the purposes hereinbefore discussed, but the pilot valve units are provided with control spools 155 and 156 that not only have the wide central circumferential groove that characterizes the spool 85' for use with single acting hydraulic cylinders, but also have axially elongated end grooves at opposite sides of the center groove. The end grooves maintain each of the service passages of the pilot valves in communication with their bridging passages 97 whenever the control spools are in neutral position, such as is the case in the pilot valve 153.

The two pilot valve units 153 and 154 have been here more or less diagrammatically illustrated as being of the type that are stacked together in a bank, having an open center passage that communicates at one end with an inlet port 157, and has its other end connecting with an outlet port 158 that is communicated with the reservoir line 33 by a duct 159.

The inlet 157, of course, is communicated with the inlet chamber 106 in the body of the metering valve unit 19 by a duct 160, as before described, and for the sake of convenience, a duct 161 is shown communicating the downstream branch of the through passage in the pilot valve unit 153 with the upstream branch of the through passage in the pilot valve unit 154. It is to be understood, of course, that in a stacked valve assembly of this type, the last named branches of the open center passage are in direct communication with one another.

When both pilot control spools are in their neutral positions, pump output fluid flows freely through the body of the metering valve unit 19 and duct 160 to the inlet 157 of pilot valve unit 153, and continues through the open center passage, comprising the branches thereof in both pilots 153 and 154, to the return line 159. At such times, the absence of back pressure in the pressure chamber 106 allows the metering valve 35 to be held in its bypass open position by the force of pump output fluid in the inlet chamber 30 of the metering valve unit 19, and no pump fluid flows to the directional control unit 18. If the pilot control spool of either pilot valve is shifted out of neutral, to the left, to a metering position such as occupied by pilot spool 156, the flow of pressure fluid through the open center passage is limited, and a degree of back pressure is created in the pressure chamber 106 such as to cause the metering valve 35 to assume the partly open position shown. Hence, with the pilot control spools in their positions illustrated, a metered amount of fluid issuing from the pump will flow through the main supply line 27 to the inlet 28 of the directional control valve unit, for delivery to the port of the cylinder 152 via the passage 41' in the directional control valve unit in the manner first described. At such a time, a duct 162 communicates the pressure chamber for the inlet check 46 with the exhaust passage 95 of the pilot valve unit 154, so that pressure fluid entering the inlet of the directional control valve unit can unseat the supply check 46 and flow through the passage 41' to the cylinder 152. The other supply check 45 and the two exhaust checks 47 and 48 are firmly held seated by their piston actuators at this time, since their chambers 60 are pressurized in a manner which will now be described.

Whenever the control spool of either pilot valve is shifted out of neutral to a position either partially or completely blocking the open center passage therein, the back pressure that builds up in the auxiliary supply line 160 is manifested in the bridge passages 97 of both pilot valve mechanisms and also in any service passage 91'–92' then in communication with the bridge passages. For example, with pilot control spool 155 in neutral and spool 156 shifted to its left-hand operating position shown, pressure builds up in all the service passages of the pilots except for passage 91' of the pilot unit 154, which is then communicated by its control spool with the exhaust passage 95.

Suitable control ducting 165, 166 and 167 cooperates with the pilot control spools to provide for selective operation of either hydraulic cylinder at the dictation of its pilot valve. The duct 165 is, in effect, a part of the duct 160 of the auxiliary supply line, and its branches 166 and 167 lead into the bridge passages 97 of the pilot valves through check valve controlled ports, as before. It will be appreciated, however, that in an actual valve, the inlet 157 of pilot valve 153 would connect with a header 168 that extends downwardly through the stacked bodies of both pilot valve units. Similarly, the exhaust passages would be connected by a header 169 inside the valve mechanisms, but here shown as a duct that communicates with the return duct 159 and hence with the reservoir line 33.

It is believed to be apparent that the control spool of either pilot valve unit 153 or 154 may be shifted to the left of neutral to effect extension of the piston rod of its associated hydraulic cylinder 151–152 at a rate controlled by the metering valve 35. Similarly, the control spool of either pilot may be shifted to the right of neutral to effect retraction of the piston rod of its associated cylinder at a rate controlled by its corresponding exhaust check 47–48.

Inasmuch as the bridge passages 97 of both pilots are pressurized whenever either pilot control spool is shifted to an operating position, it will be apparent that the two pilots are connected in parallel circuit relationship, allowing both cylinders to be operated simultaneously by their pilot valves.

Figure 7:
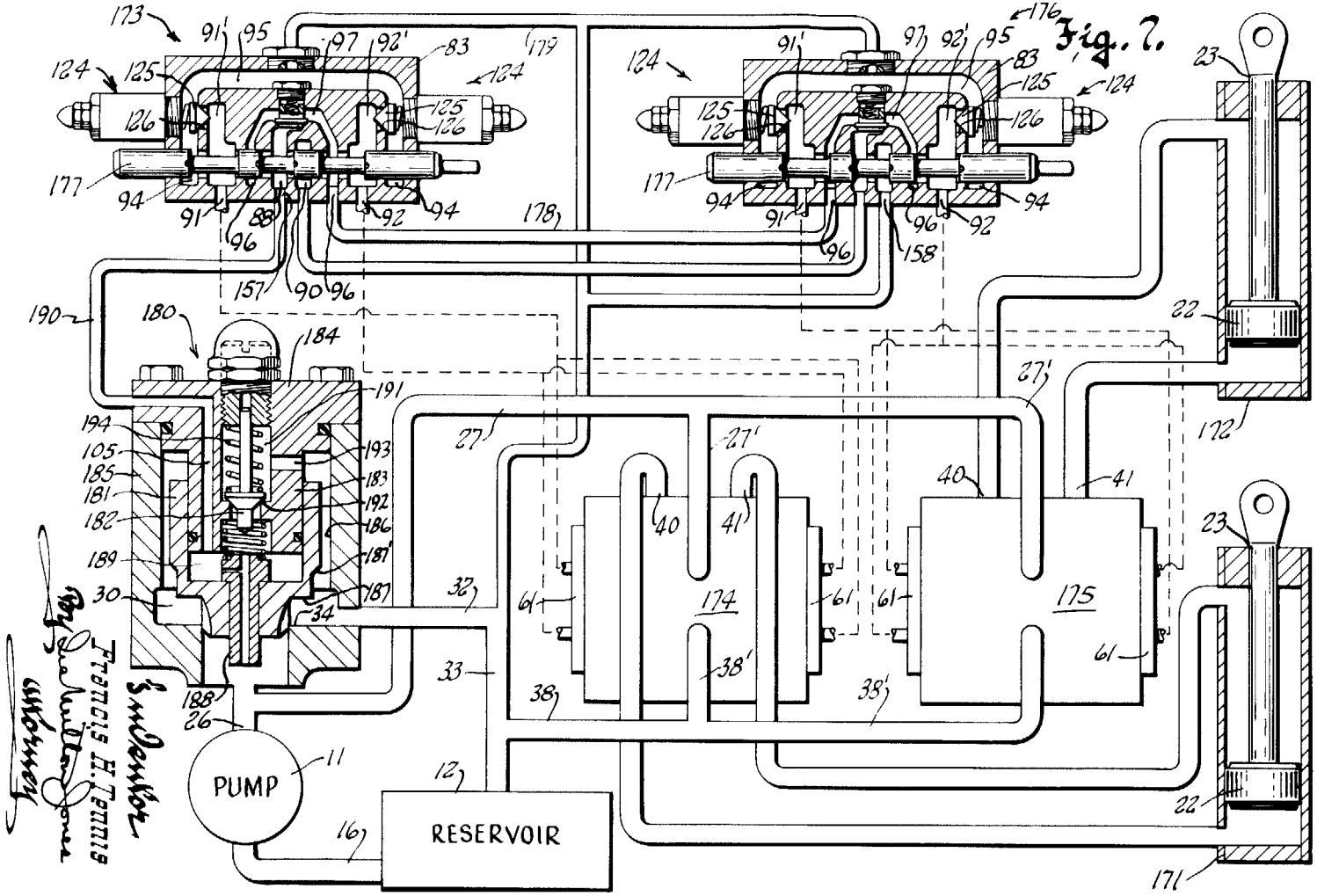
FIGURE 7 is a diagrammatic view similar to FIGURE 6, but showing a control valve mechanism of this invention incorporated in a fluid pressure operated system that comprises a pair of double acting hydraulic cylinders.

The system shown in FIGURE 7 contains control valve mechanism suitable for governing the operation of two double acting cylinders 171 and 172. Its operation is believed to be obvious due to its similarity to the system shown in FIGURES 1 and 2, since it involves primarily a duplication of pilot and directional control valve units. Pilot unit 173 governs a directional control valve unit 174 to control the operation of cylinder 171, and pilot unit 176 governs a directional control valve unit 175 to control cylinder 172. Again in this case, the pilot valves are connected in parallel circuit relationship, as by a duct 178 communicating their bridge passages 97; the control spools 177 are like those of the pilots shown in FIGURE 6; and the exhaust passages 95 of the pilots are communicated by a duct 179 that connects with the reservoir line 33 and with the outlet 158 of the pilot valve mechanism.

In the FIGURE 7 embodiment, however, a somewhat different form of metering valve mechanism 180 has been illustrated, wherein the metering valve member 181 also acts as a high pressure relief poppet which is movable to a bypass open position off of its seat 34 in consequence of unseating of a pilot poppet 182 in its interior.

Since the metering valve unit 180 operates on the principle disclosed in my copending application, Serial No. 202,508, filed June 14, 1962, *now Patent No. 3,164,166,* and in most respects is constructed similarly thereto, reference may be had to said [copending application] *patent* for a complete disclosure thereof. It will be sufficient to here note that the cup-like metering valve member 181 is slidably but sealingly telescoped over a cylindrical guide 183 on the underside of a cover 184 fixed to the top of the body 185 of the unit. The body has a bore 186, substantially larger in diameter than the metering valve member, which is at all times in communication with the bypass 32, and which is closed at its upper end by the cover 184. The lower end of the bore 186 opens to the inlet chamber 30 through the upwardly facing annular valve seat 34 that is engaged by the seating surface 187 on the valve member when the bypass 32 is closed.

A tube 188 projecting through the lower end of the valve member 181 and slidable axially relative thereto, affords a passage through which fluid in the inlet chamber 30 can flow into the hollow interior of the valve member, into the chamber 189 therein beneath the lower end of the guide 183. A passage 105 in the guide, opening to the chamber 189 and to the exterior of the cover 184, connects with the inlet 88 of the pilot valve 173 by means of a duct 190, as in the first described embodiments of the invention, to enable a small amount of control fluid to flow to the pilot mechanism, and so that operation of the pilot valve spool can create the back pressure in the chamber 189 necessary to effect either partial or complete closure of the valve member 181. Upwardly of its seating surface 187, the bypass valve member 181 is enlarged to provide a circumferential downwardly facing shoulder 187' upon which pressure fluid in the bypass line 32 can exert a force capable of opening the bypass valve member at times when the pressure of fluid in the inlet chamber drops to a value below that of reservoir pressure. This, of course, occurs when there is danger of drawing a void in a cylinder being supplied with fluid from the pump, and allows reservoir fluid to flow back through the bypass valve to the inlet chamber and hence to the main supply line to augment the flow of pump output fluid to the cylinder.

The pilot poppet 182 controls a venting passage for the chamber 189, which passage leads upwardly through the bottom of the guide 183 and opens to its hollow interior 191 through an annular valve seat 192 that is normally engaged by the pilot poppet. A radial port 193 in the side of the guide 183 communicates its hollow interior with the space in the bore surrounding the valve member 181, and hence with the bypass, so as to vent the chamber 189 in the valve member to the bypass line when the pilot poppet 182 is opened. Whenever that occurs, of course, the back pressure within the chamber 189 is relieved, and the valve member 181 is lifted off of its seat to its bypass open position.

The pilot poppet 182 is subjected to the pressure obtaining in the chamber 189, and consequently to that of pump output fluid in the inlet chamber 30. It is unseated against the bias of its spring 194 whenever the pressure of fluid in chambers 30 and 189 reaches a predetermined high relief value, to effect unloading of the pump.

Figure 8:
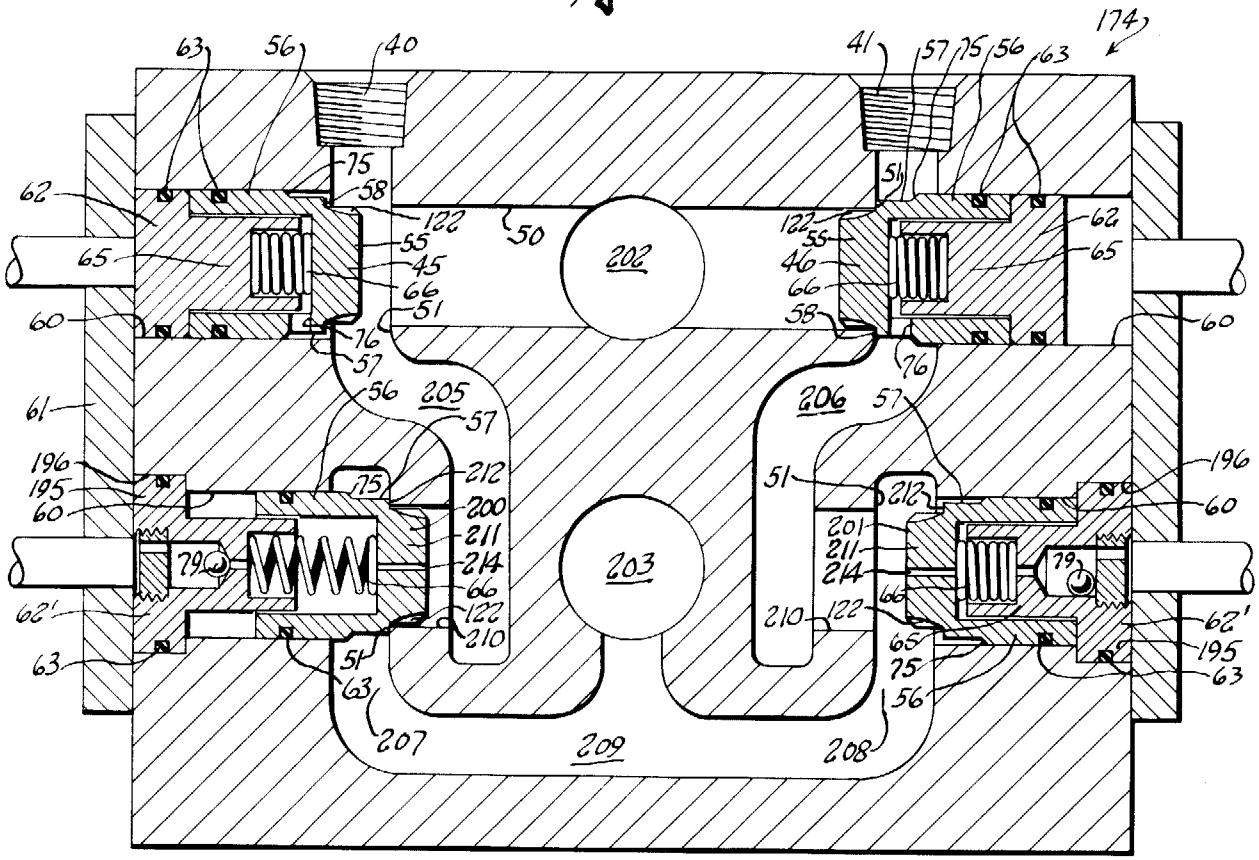
FIGURE 8 is an enlarged detail sectional view of one of the distributing or directional control units incorporated in the control valve mechanism of FIGURE 7.

The directional control valve units 174 and 175 contain pairs of supply and exhaust checks which may be identical to those previously described. As shown in FIGURE 8, however, only the supply checks 45 and 46 are the same as those discussed hereinbefore; and somewhat improved metering action of fluid exhausting from the cylinders 171 and 172 is obtained with exhaust checks 200 and 201 of slightly different construction to be described shortly.

Like the pilot valves, the bodies of the directional control valves 174 and 175 may be adapted for stacking in a bank having a common supply header 202 opening to the medial portion of the bore 50, which is adapted to be communicated with the main supply line 27; and a common exhaust header 203 located centrally between the exhaust checks, which is adapted to be communicated with the main exhaust line 38. For the sake of convenience of illustration, the two directional control mechanisms 174 and 175 have been shown separated in FIGURE 7, wherein a branch 27' of the main supply line 27 is shown connecting with an inlet in each directional valve mechanism, and a branch 38' of the main exhaust line is shown connecting with an outlet for each directional control valve mechanism.

As before, passages 205 and 206 in the body of each directional control valve mechanism, respectively communicating with the service outlets 40 and 41, have portions that are common to both the main supply and exhaust lines 27 and 38. In this case, however, the passages 205 and 206 open upwardly to the service ports 40 and 41, and their lower ends are offset a distance toward one another so that each lies between the inner end of its associated return check 200–201 and the exhaust header 203.

The counterbores 60, that provide the pressure chambers containing the hollow outer portions of the return checks open inwardly to the opposite branches 207–208 of a U-shaped exhaust passage 209 that is communicated with the exhaust header 203, and the exhaust branches in turn are communicated with the inwardly offset lower end portions of the passages 205 and 206 through annular valve seats 51 at the outer ends of short bores 210 which are coaxial with the counterbores 60. As before, the exhaust checks have reduced metering ends 211 that loosely fit the bores 210 and project inwardly from their circumferential seat engaging shoulders 212.

Small diameter coaxial passages 214 through the reduced inner end portions of the return checks 200–201 serve the same purpose as the radial ports in the sides of the check valves previously described. Hence, it will be seen that the construction of the exhaust checks 200–201 is somewhat similar to that of the metering valve 35 in the first described embodiment of the invention.

In the directional control units 174–175 shown in FIGURES 7 and 8, each of the exhaust check valves 200–201 is adapted to be held in its seated position by the pressure of supply fluid in its hollow interior, which is communicated with the adjacent supply passage 205 or 206 through the small diameter axial passage 214 in its reduced inner end. This is possible for the reason that those surfaces of the exhaust checks which face outwardly have greater surface area than [thtose] *those* on the exterior of the reduced inner ends of the checks.

For this reason, the exhaust checks 200–201 do not need piston-like actuators to hold them closed, and members 62′ constructed like the piston actuators heretofore described are fixedly mounted in the outer portions of the chambers 60. In this case, however, each of the members 62′ has an enlarged head 195 at its outer end received in a well 196 formed as an enlargement of its chamber 60, at the outer end thereof, with the head confined between the adjacent retaining plate 61 and the bottom of the well to hold the member against axial movement. In all other respects, the members 62′ are identical to the actuators 62 discussed previously.

As mentioned, the control system shown in FIGURES 7 and 8 incorporates parallel circuit pilot valve mechanism 173–176, that enables selective or concurrent operation of the hydraulic cylinders 171–172. With the spool of the pilot valve 176 in its neutral position and the spool of the pilot valve mechanism 173 shifted to an operating position to the left of its neutral or hold position, as seen in FIGURE 7, supply check 45 and return check 201 in directional control valve mechanism 174 (FIGURE 8) will open, and all of the other check valves in both directional control valve units will be held firmly on their seats. This results from the fact that the pressure chambers of check valves 45 and 201 will be vented to the exhaust passage 95 in pilot valve mechanism 173, while the chambers of the remaining check valves will be in communication with the connected and then pressurized bridge passages 97 of the two pilot valves, so that the ball checks 79 in exhaust valve 200 and the two remaining exhaust valves will be seated. Consequently, the piston rod of cylinder 171 will be extended while the piston rod of cylinder 172 will be held stationary. However, the cylinder 172 can also be operated at such a time in consequence of shifting of the spool of its pilot mechanism 176 out of its neutral position shown.

Again in this case, the metering valve unit 180 is operable to cause pump output fluid to bypass the main supply line whenever the spools of both pilot valve mechanisms are in their neutral positions, and to meter the flow of supply fluid to the directional control valve units in accordance with the degree that the spool of either pilot valve obstructs the flow of pressure fluid through its open center passage. Similarly, the return checks 200 and 201 can be caused to assume partially open positions to limit the flow of fluid exhausting from either cylinder 171–172 to a degree proportional to the amount of fluid allowed to flow through the hollow interiors of the return checks to the exhaust passage 95 of the pilot valve mechanisms when the spools of the latter are in metering positions such as described previously.

It will be appreciated that the directional control valves of the preceding embodiments of the invention can also have exhaust valve mechanisms of the type shown in FIGURES 7 and 8, or they may be merely provided with members 62 that are held against axial motion as are the members 62′ shown in FIGURE 8, thus rendering the exhaust checks per se operable in response to pressure on each end thereof.

A highly important feature of the directional control units of FIGURE 8 is that the exhaust valves thereof are also adapted to serve as anti-cavitation or void control valves. For example, the exhaust valve 200 will open in consequence of the forces which exhaust fluid in the passage 209 exert upon its inwardly facing shoulder 75 if the pressure of supply fluid in the passage 205 drops to a value below that of the fluid in the exhaust passage 209. When this occurs, exhaust fluid flows through branch 207 of the exhaust passage and the then open exhaust valve 200 to the supply passage branch 205 to augment the flow of pump fluid to service port 40 and hence to the low pressure end of the hydraulic cylinder to positively preclude a void being drawn therein. The exhaust check 201 operates in the same manner and under the conditions described at times when the supply check 45 is open and fluid is being supplied to the other end of the motor, from service port 41.

Another important feature of the invention is that the combined metering and bypass valve unit 180 is also capable of functioning as a void control instrumentality, thus providing an additional safeguard against void formation in a hydraulic motor governed by the valve mechanism. This results from the fact that the drop [is] *in* pressure in the end of a cylinder being supplied with pump output fluid, at times when there is danger of drawing a void in said end of the cylinder, is manifested in a reduced back pressure on the internal surfaces of the metering or bypass valve member 180, so that the valve [members] *member* will be caused to open whenever the pressure at the pump outlet, and consequently in the inlet chambers 30 of the units drops to a value below that of fluid in the bypass line 32. Exhaust fluid in the bypass line 32, of course, at all times exerts an opening force on the shoulder 187′ by the bypass valve member. This opening force is normally overcome by the closing force exerted on the bypass valve by back pressure in its interior. However, when the pressure drops in the inlet chamber 30 of the bypass valve unit, the back pressure relied upon to hold the bypass valve member closed, or at least partially closed, also drops and the bypass valve member opens as described. This allows reservoir fluid to flow in reverse through the bypass line 32 to the inlet chamber 30 of the bypass unit, and hence to the main supply line 27, thus augmenting the flow of pump output fluid to the motor and preventing formation of a void therein.

From the foregoing description, together with the accompanying drawings, it will be apparent to those skilled in the art that this invention provides greatly improved control instrumentalities featuring exceptionally small and easily operated pilot valve mechanism capable of accurately regulating the speed as well as the direction of operation of fluid motors governed thereby.

What is claimed as my invention is:

[1. In a fluid pressure operated system including a fluid motor, a pressure fluid source, and a supply line to connect the motor with the pressure fluid source:

(A) a control device having
  (1) an inlet port,
  (2) an outlet
  (3) a passage connecting the inlet port with the outlet,
  (4) conduit means to connect the inlet port with the pressure fluid source,
  (5) and valve means to control fluid flow through said passage, movable between passage open and passage closing positions, through a range of passage restricting positions throttling the flow of fluid through said passage to thus create back pressure in said conduit means of a value that depends upon the degree to which said passage is restricted by the valve means;

(B) and a motor speed regulating device having (1) an inlet connected with the pressure fluid source, (2) an exhaust passageway connecting with the inlet and providing a bypass through which pressure fluid from said source flows in bypass relation to the supply line when said exhaust passageway is open, (3) and a pressure responsive metering valve for said exhaust passageway, movable between bypass open and bypass closing positions and to a number of intermediate bypass restricting positions to meteringly divert different amounts of pressure fluid from the source to the supply line, (4) said metering valve being movable toward bypass open position in response to the pressure of source fluid at its inlet, (5) and the metering valve being responsive to back pressure in said conduit means and movable thereby toward bypass closing position, against the opening force exerted thereon by pressure fluid at said inlet, in consequence of increasing back pressure in said conduit means, to thus decrease the amount of source fluid bypassing the supply line and correspondingly increase the amount of source fluid flowing through the supply line to the motor.]

[2. A fluid pressure operated system comprising in combination with a pump, a fluid motor, and a delivery line through which pump output fluid is supplied to the motor to operate the same:

(A) control valve mechanism operatively connected with the pump and with the motor, for governing operation of the latter, said control valve mechanism having (1) an inlet connected with the pump to receive output fluid therefrom, (2) a passage connecting with the inlet, (3) and a valve element controlling said passage, movable in one direction from a position at which it provides for free flow of fluid therethrough to positions either partially or completely blocking said passage in order to effect operation of the motor;

(B) and a motor throttling device operatively connected with said control valve mechanism and governed thereby, said motor throttling device having:

(1) an inlet connected with the pump to receive output fluid therefrom, (2) an exhaust passageway connecting with said inlet and providing a bypass through which pump output fluid flows in bypass relation to the motor when said exhaust passageway is open, (3) and a pressure responsive metering valve to control fluid flow through said bypass, said metering valve being movable toward bypass open position in response to the pressure of pump output fluid at the inlet of the throttling device, and being movable toward bypass closing position, against the force which pump output fluid exerts thereon, in response to the increase in pressure that is manifested at the inlet of the control valve mechanism whenever the valve element thereof is moved to positions either partially or completely blocking said passage in the control valve mechanism, to thus decrease the amount of pump output fluid bypassing the motor in correspondence with the extent to which the valve element blocks said passage in the control valve mechanism.]

[3. The fluid pressure operated system of claim 2, further characterized by:

(A) a relief valve which is connected with the pump and comprises a relief poppet that is biased to a closed position but which is movable to an open position in response to the forces which pump output fluid exert thereon at times when the pressure of such fluid rises to a predetermined high relief value;

(B) and means defining a relief passage that is controlled by said relief poppet, said relief passage having an exhaust outlet and having an inlet that is communicated with the inlet of said control valve mechanism, so that opening of the relief poppet vents the connection between the motor throttling device and the control valve mechanism and renders the metering valve responsive only to the pressure of pump output fluid at the inlet of the motor throttling device.]

[4. The fluid pressure operated system of claim 2, further characterized by:

(A) a relief passage in said motor throttling device connecting with said exhaust passageway thereof;

(B) conduit means connecting said relief passage with the inlet of the control valve mechanism;

(C) and a relief valve in said motor throttling device, governing communication between said conduit means and the relief passage and yieldingly biased to a closed position blocking said communication, said relief valve mechanism being adapted to open in consequence of rise in pressure at the inlet of the throttling device to a predetermined high relief setting.]

5. In a fluid pressure operated system including a fluid motor and a pressure fluid source, control instrumentalities to govern the flow of pressure fluid to and from the motor, comprising:

(A) duct means providing a supply line through which pressure fluid is delivered to the motor from the pressure fluid source;

(B) duct means connecting with the supply line and providing a bypass line through which pressure fluid from the source can be exhausted in bypass relation to the supply line;

(C) duct means providing an exhaust line through which pressure fluid can be exhausted from the motor;

(D) a first fluid pressure responsive valve mechanism cooperable with said bypass and supply lines to control fluid flow therethrough, said valve mechanism being adapted for pressure produced actuation from a bypass open to a bypass closed position to cause supply fluid to flow through the supply line to the motor;

(E) a second fluid pressure responsive valve mechanism to control the exhaust of fluid from the motor through said exhaust line, said second valve mechanism being adapted for pressure produced actuation from an open position to a closed position blocking the exhaust of fluid from the motor;

(F) and a control mechanism operatively connected with said fluid pressure responsive valve mechanisms and with the fluid pressure source to receive control fluid therefrom, said control mechanism having a valve element which is movable to and from an operating position at which it imposes the pressure of control fluid upon both of said valve mechanisms to simultaneously effect pressure produced closure thereof.

6. The fluid pressure operated system of claim 5, wherein the valve element of the control mechanism is movable to a second position to free said pressure responsive valve mechanisms of control fluid pressure forces; wherein said first pressure responsive valve mechanism is adapted for actuation to its open position in response to the forces which supply fluid exert thereon at times when said valve element is in said second position thereof; and wherein said second pressure responsive valve mechanism is adapted for actuation to its open position in response to the forces which motor exhaust fluid exert thereon at times when said valve element is in said second position thereof.

7. In control apparatus for governing the flow of pressure fluid to and from a fluid motor:

(A) a main valve mechanism having
  (1) a pressure fluid supply port,
  (2) a service port, from which a fluid motor may be supplied with pressure fluid,
  (3) an exhaust port to receive fluid exhausting from a motor,
  (4) passage means communicating the service port with both the supply and exhaust ports,
  (5) a pressure responsive valve mechanism associated with said passage means, and comprising a valve member movable to and from a closed position blocking communication between the service and exhaust ports without interfering with the flow of fluid from the supply port to the service port,
  (6) a second valve member associated with said passage means and arranged to block fluid flow from the service port to the supply port, but movable to an open position at which fluid can flow from the supply port to the service port [;]. *in response to the direct action of fluid in the supply port upon a portion of said second valve member;*

(B) a pilot valve mechanism operatively connected with and controlling said main valve mechanism, and having
  (1) An inlet for pressure fluid,
  (2) an exhaust passage,
  (3) a control port,
  (4) and means comprising a valve element which is movable from one to the other of a pair of operating positions to selectively communicate said control port with either the exhaust passage or the inlet of said pilot valve mechanism;

(C) and means sensitive to the pressure fluid at said pilot control port for holding said first designated valve member in its closed position in response to the pressure of fluid that obtains at the control port when it is in communication with the inlet of the pilot valve mechanism without interfering with opening of said first named valve member whenever the valve element of the pilot valve mechanism is moved to its position communicating the control port with the exhaust passage of said pilot valve mechanism.

8. The control apparatus of claim 7, wherein said second valve member is part of another pressure responsive valve mechanism; said pilot valve mechanism has a second control port which is communicated with the inlet of the pilot valve mechanism by its valve element when said first designated control port is in communication with the exhaust passage, and which is communicated with the exhaust passage by said valve element, when said first designated control port is in communication with the inlet of the pilot valve mechanism; and other means sensitive to the pressure obtaining at said second control port for holding said second valve member in its closed position in response to the pressure of fluid that obtains at said second control port when it is in communication with the inlet of said pilot valve mechanism, without interfering with opening of said second valve member whenever said second control port is in communication with the exhaust passage of the pilot valve mechanism.

9. In a fluid pressure operated system including a motor having a port through which pressure fluid may flow to and from the motor, a pump, and a supply line connecting the outlet of the pump with said motor port:

(A) a supply valve yieldingly biased toward a closed position blocking the supply line, but capable of movement to an open position in response to the *direct action thereon of* pressure [of] fluid in a portion of the supply line upstream from the supply valve;

(B) means defining an exhaust line connecting with said motor port;

(C) an exhaust valve yieldingly biased toward a closed position blocking the exhaust line, but capable of movement to an open position in response to the pressure of fluid at said motor port;

(D) fluid pressure operated actuating means for the exhaust valve, comprising
  (1) means defining a pressure chamber having an inlet port,
  (2) and a pressure responsive actuator in said chamber operatively connected with the exhaust valve to hold the same in its closed position in consequence of the flow of pressure fluid into said chamber, against the opening forces which exhaust fluid from the motor impose on the exhaust valve;

(E) and a pilot control device for said actuating means, having
  (1) an inlet connected with the pump to receive output fluid therefrom,
  (2) an exhaust passage,
  (3) a control port connected with the inlet port of said pressure chamber, and
  (4) a valve element movable to each of a pair of operating positions to selectively communicate said control port with either said inlet or said exhaust passage.

10. The fluid pressure operated system of claim 9, further characterized by other valve means cooperating with said supply valve to govern the flow of pressure fluid through the supply line to said motor port.

11. The fluid pressure operated system of claim 10, wherein said other valve means is connected with said pilot control device to be controlled thereby, and comprises a pressure responsive valve that is actuated to a position permitting supply fluid to flow through said supply line to the motor in consequence of the pressure of fluid obtaining at the inlet of the pilot control device when said valve element thereof is in its position communicating said control port with the inlet of the pilot control device.

12. In a fluid pressure operated system including a motor having port means through which pressure fluid may flow to and from the motor, and a pump to supply fluid under pressure to the motor:

(A) supply duct means connecting the pump with said motor port means;

(B) exhaust duct means connecting with the motor port means;

(C) a supply valve having a valve member yieldingly biased toward a closed position blocking the supply duct means, but capable of being moved to an open position in response to the pressure of fluid in the supply duct means upstream from the supply valve;

(D) an exhaust valve having a valve member yieldingly biased toward a closed position blocking the exhaust duct means, but capable of being moved to an open position in response to the pressure of fluid flowing into the exhaust duct means from the motor;

(E) separate fluid pressure responsive actuating means for said supply and exhaust valves, each comprising a pressure chamber having an inlet port and a pressure responsive actuator in the chamber operatively connected with its associated valve member, said actuators being adapted to hold their respective supply and exhaust valve members in their closed positions in response to the forces which pressure fluid in their associated chambers exert thereon;

(F) and a pilot control valve mechanism for said actuating means, having (1) an inlet connected with the pump to receive pressure fluid therefrom, (2) exhaust outlet means, (3) a pair of control ports, one connected with the inlet port of the pressure chamber for the supply valve and the other connected with the inlet port of the pressure chamber for the exhaust valve, (4) and a valve element in said pilot control valve mechanism, movable from a neutral position at which it communicates the inlet and outlet means of the pilot valve mechanism, to each of a pair of operating positions to block communication between the inlet and outlet means and selectively divert pressure fluid from the inlet to either of said control ports while communicating the other control port with the exhaust outlet means.

13. The fluid pressure operated system of claim 12 further comprising:

(A) means defining a bypass duct connected with the pump to receive output fluid therefrom, and through which pump output fluid can be exhausted, in bypass relation to the supply line;

(B) a pressure actuatable bypass valve mechanism connected with said pilot control valve mechanism and governing said bypass duct, said bypass valve mechanism being movable toward and from a position closing the bypass duct and diverting pump output fluid into the supply duct means in consequence of the pressure obtaining at the inlet of the pilot valve mechanism at times when its valve element blocks communication between the inlet and outlet means of the pilot control valve mechanism.

14. Means for governing the operation of a fluid motor, comprising the combination of:

(A) pilot valve mechanism having (1) an inlet for pressure fluid, (2) exhaust outlet means, (3) a pair of control ports, (4) and a valve element movable from one to the other of a pair of operating positions to in turn communicate each control port with the inlet and the other control port with the exhaust outlet means;

(B) a control valve governed by the pilot valve mechanism and having (1) a service port, (2) a fluid supply passage communicating with the service port, (3) an exhaust passage communicating with the service port, (4) a supply valve movable toward and from a closed position blocking the supply passage, (5) an exhaust valve movable toward and from a closed position blocking the exhaust passage, (6) and a fluid pressure operated actuator for each of said supply and exhaust valves operable when subjected to fluid pressure forces to hold its valve in closed position and to permit its valve to be moved out of its closed position when the fluid pressure forces on the actuator are relieved;

(C) and control ducts connecting the pilot control ports with said actuators so that movement of the pilot valve element from one to the other of its operating positions in turn causes each of said actuators to be subjected to fluid pressure forces and relieves the other actuator of said forces.

[15. In a fluid pressure operated system including a pump, a reservoir, and a fluid motor:

(A) conduit means connecting the pump with the motor and providing a main supply line through which pressure fluid can flow to the motor;

(B) means defining a pair of ducts each communicating the main supply line with the reservoir, one of said ducts providing a bypass line through which pump output fluid can bypass the main supply line and be returned to the reservoir, and the other duct providing a control line through which only a small proportion of the pump output can flow to the reservoir;

(C) a fluid pressure responsive bypass valve to govern flow through said bypass line, having a portion upon which pump output fluid exerts force tending to move the bypass valve to a fully open position;

(D) a master control valve governing fluid flow through said control line, and having a valve element that normally occupies an open position providing for free flow of pump fluid through said control line, but which is movable out of said normal position to close said control line and thus cause back pressure to be built up in the pump side of said control line; and means for imposing such back pressure upon another portion of the bypass valve to effect closing thereof in opposition to said opening forces which pump output fluid imposed thereon.]

[16. In a fluid pressure operated system including a pump, a reservoir, and a fluid motor:

(A) conduit means connecting the pump with the motor and providing a main supply line in which pressure fluid can flow to the motor;

(B) means defining a pair of ducts each connecting the main supply line with the reservoir, one of said ducts providing a bypass through which pump output fluid can bypass the main supply line and be returned to the reservoir, and the other duct providing a control line through which only a small proportion of the pump output can flow to the reservoir;

(C) a fluid pressure responsive bypass valve to govern flow through said bypass line, having a portion upon which pump output fluid exerts force tending to move the bypass valve to a fully open position;

(D) a control valve for said control line, having a valve element to govern fluid flow therethrough, said valve element being movable from an open position providing free flow of pump output fluid through said control line, to a closed position preventing such flow, through a number of intermediate throttling positions adjustably restricting fluid flow through said control line to cause varying degrees of back pressure to be built up in the pump side thereof; and means by which back pressure in the pump side of said control line is imposed upon another portion of the bypass valve in opposition to said opening force which pump output fluid imposes thereon, and by which the bypass valve can be moved toward a bypass closing position an extent determined by the magnitude of the back pressure built up in the pump side of said control line by the valve element of the control valve.]

[17. The fluid pressure operated system of claim 16, wherein the fluid motor has a port through which pressure fluid can exhaust from the motor, and further characterized by:

(A) means providing an exhaust duct connecting said motor port with the reservoir;

(B) means providing a normally closed check valve for the main supply line arranged to open to permit pump output fluid to flow through the main supply line to the motor but to prevent reverse fluid flow;

(C) means providing a normally closed check valve for the exhaust duct arranged to open to permit fluid exhausting from said motor port to flow through said exhaust duct to the reservoir but to prevent fluid in the main supply line from flowing through the exhaust duct to the reservoir;

(D) and fluid pressure operated means governed by the valve element of said control valve, for holding said exhaust check valve closed in response to the pressure of fluid in the control valve obtaining as a consequence of movement of said valve element to a position effecting restriction of fluid flow through said bypass.]

18. A fluid pressure operated system comprising the combination of:

(A) a fluid motor having a port through which pressure fluid can flow to and exhaust from the motor;

(B) means providing a source of fluid under pressure;

(C) means providing a supply line connecting said motor port with the source of fluid under pressure;

(D) means providing an exhaust line connecting with said motor port;

(E) pilot valve mechanism having (1) an inlet for pressure fluid, (2) exhaust outlet means, (3) a passage connecting said inlet and outlet means, (4) and a valve element movable in opposite directions from a passage open position to each of a pair of operating positions in one of which it closes said passage;

(F) means providing an auxiliary supply line connecting the inlet of the pilot valve mechanism with the source of fluid under pressure;

(G) means governed by the pilot valve mechanism for controlling fluid flow through the main supply line to said motor port, comprising fluid pressure responsive valve means;

(H) other fluid pressure responsive valve means governed by the pilot valve mechanism for controlling exhaust flow of fluid from said motor port;

(I) means rendering said first designated valve means effective to permit fluid flow through the supply line to said motor port in consequence of the rise in pressure that occurs at the inlet of the pilot valve mechanism as a result of movement of the pilot valve element to said passage closing position thereof, and rendering said first designated valve means effective to stop fluid flow through the supply line to said motor port in consequence of the low pressure obtaining at the inlet of the pilot valve mechanism at times when said valve element controlled passage thereof is open;

(J) and means rendering said other valve means effective to close the exhaust line in consequence of said rise in pressure at the inlet of the pilot valve mechanism, and to provide for opening of said second valve means whenever said valve element is in the other of said operating positions thereof.

19. A fluid pressure operated system comprising the combination of:

(A) means providing a source of fluid under pressure;

(B) a fluid motor having a port through which pressure fluid can flow to and exhaust from the motor;

(C) means providing a main supply line connecting said motor port with the fluid pressure source;

(D) means providing an exhaust line connecting with said motor port;

(E) pilot control mechanism having (1) an inlet for pressure fluid, (2) exhaust outlet means, (3) a passage connecting the inlet and exhaust outlet means, (4) a pair of control ports, (5) and a valve element cooperable with said passage and movable in opposite directions from a neutral passage open position to each of a pair of operating positions to selectively communicate either of said control ports with the exhaust outlet means and the other control port with the inlet;

(F) means providing an auxiliary supply line connecting the inlet of the pilot control mechanism with the fluid pressure source;

(G) a supply valve yieldingly biased to a closed position blocking the main supply line but movable to an open position in response to the pressure of fluid in the main supply line;

(H) an exhaust valve yieldingly biased to a closed position blocking the exhaust line but movable to an open position in response to the pressure of fluid exhausting from said motor port;

(I) fluid pressure responsive valve actuating means connected with one of said control ports of the pilot mechanism so as to be controlled by the latter, for holding the exhaust valve closed in consequence of movement of the pilot valve element to a first one of said operating positions at which said last named control port is in communication with the inlet of the pilot mechanism;

(J) and other fluid pressure responsive valve actuating means connected with the other control port of the pilot mechanism so as to be controlled by the latter, for holding said supply valve closed in consequence of movement of the pilot valve element to the other of said operating positions thereof at which said other control port is in communication with the inlet of the pilot mechanism.

20. The fluid pressure operated system of claim 19, further comprising:

(A) means defininig a bypass connected with the fluid pressure source and through which supply fluid can be exhausted so as to bypass the main supply line;

(B) a pressure responsive bypass valve movable from bypass closed to bypass open positions in response to the force which pressure fluid from the source exerts on one portion thereof;

(C) and means for imposing upon another portion of said bypass valve, to effect closure thereof, the fluid pressure which obtains in said auxiliary supply line at times when the valve element of the pilot mechanism is in said first operating position at which opening of the exhaust valve member is prevented.

21. In a fluid pressure operated system including a reservoir for fluid, a pump having an inlet connected with the reservoir and having an outlet, and a fluid motor having a port through which pressure fluid may be supplied to and exhausted from the motor:

(A) means providing a motor supply line connecting with the pump outlet, through which pressure fluid is supplied to the motor;

(B) means providing an exhaust line connecting said motor port with the reservoir;

(C) means providing a bypass line connected with the outlet of the pump, and through which pump output fluid can be returned to the reservoir in bypass relation to the motor;

(D) a fluid pressure actuable bypass valve mechanism governing said bypass, movable toward a bypass open position in response to the force which pump output fluid imposes on one portion thereof;

(E) means providing fluid pressure actuatable supply and exhaust valve mechanisms respectively controlling said supply and exhaust lines, and yieldingly biased toward closed positions blocking fluid flow through their respective lines, but movable toward open positions in consequence of the forces which supply and exhaust fluid in their respective lines exert thereon;

(F) and pilot control valve means supplied with control fluid from the pump outlet and operatively connected with said fluid pressure actuatable bypass, supply, and exhaust valve mechanisms, said pilot valve means having a valve element which is movable to a first operating position at which it causes the force of control fluid under pressure to be simultaneously imposed upon the exhaust valve mechanism and another portion of the bypass valve mechanism to effect closure thereof and accordingly effect flow of pressure fluid from the pump outlet through the supply line to the motor port, and said valve element being movable to a second operating position at which it relieves the bypass and exhaust valve mechanisms of said force and causes the force of control fluid under pressure to be imposed upon the supply valve mechanism to effect closure thereof and accordingly allow pressure fluid to exhaust from the motor while pump output fluid bypasses the supply line.

22. In a fluid pressure operated system including a fluid reservoir, a pump having its inlet connected with the reservoir, a fluid motor, and main supply and return lines respectively connecting the motor with the outlet of the pump and with the reservoir:

(A) a pressure responsive supply valve mechanism to control fluid flow through the main supply line to the motor;

(B) a pressure responsive return valve mechanism for the main return line to control the exhaust of fluid from the motor;

(C) duct means providing a bypass line connecting the outlet of the pump with the reservoir, and through which pump output fluid can bypass the motor and flow to the reservoir;

(D) a pressure responsive bypass valve mechanism to control fluid flow through said bypass line;

(E) a pilot valve mechanism governing said pressure responsive valve mechanisms, and having (1) auxiliary supply and return line connections with the pump and reservoir, respectively, (2) control line connections with the bypass, supply, and return valve mechanisms, (3) and a movable valve element to govern communication between said control line connections and said auxiliary supply and return line connections;

(F) and means cooperating with said movable valve element and with said control line connections to effect (1) opening of the bypass valve mechanism and closure of the supply and return valve mechanisms in a first position of said valve element, (2) closure of the bypass and return valve mechanisms and opening of the supply valve mechanism in a second position of the valve element, (3) and opening of the return valve mechanism and closure of the supply valve mechanism in a third position of the valve element.

23. The fluid pressure operated system of claim 22, wherein the pilot valve mechanism has a chamber therein into which fluid from said auxiliary supply line flows, and in which chamber the pressure of control fluid increases in proportion to the extent of movement of said valve element toward its second position from said first position thereof; and wherein said bypass valve mechanism responds to the pressure in said chamber and is caused to increasingly restrict the bypass line in accordance with pressure rise in said chamber, to thereby effect metering of the fluid flowing through the main supply line to the motor.

24. In a fluid pressure operated system including a fluid reservoir, a pump having its inlet connected with the reservoir, and a reversible fluid motor having a pair of ports through either of which fluid can be supplied to and exhausted from the motor:

(A) conduit means connected with the outlet of the pump, providing a main supply line having branch lines leading to said motor ports;

(B) conduit means connected with the reservoir, providing a main return line connecting with said branch lines to receive exhaust fluid from the motor ports;

(C) conduit means providing a bypass line connecting the outlet of the pump with the reservoir, through which pump output fluid can bypass the motor and flow to the reservoir;

(D) a pressure responsive supply valve mechanism for each of said branch lines, each effective in one position thereof to block the flow of supply fluid through its branch line;

(E) a pressure responsive return valve mechanism for each of said branch lines, each effective in one position thereof to block the flow of return fluid through its branch line;

(F) a pressure responsive bypass valve mechanism for the bypass line, effective in one position thereof to block the flow of pump output fluid through the bypass line;

(G) pilot valve mechanism to control the effectiveness of said pressure responsive valve mechanisms, and including a movable control valve element;

(H) auxiliary supply and return duct means communicating the pilot valve mechanism with the outlet of the pump and with the reservoir, respectively;

(I) and control duct means communicating each of said pressure responsive valve mechanisms with the pilot valve, (1) said auxiliary and control duct means cooperating with the pilot valve element in a first position thereof to impose the pressure of auxiliary supply fluid upon the supply valve mechanism in one of said branch lines and upon the return valve mechanism in the other branch line to thereby render them effective to block supply fluid flow through said one branch line and to block return fluid flow through said other branch line, (2) said auxiliary and control duct means cooperating with the pilot valve element in a second position thereof to impose the pressure of auxiliary supply fluid upon the supply valve mechanism in said other branch line and upon the return valve mechanism in said one branch line to thereby render them effective to block supply fluid flow through said other branch line and to block return fluid flow through said one branch line, (3) said auxiliary supply and control duct means cooperating with the pilot valve element in said first and second positions thereof to impose the pressure of auxiliary supply fluid upon the bypass valve mechanism to thereby render it effective to block the flow of pump output fluid through the bypass line, (4) and said auxiliary and control duct means cooperating with the pilot valve element in a third position thereof to relieve the bypass valve mechanism of the pressure of auxiliary supply fluid and thereby render it ineffective to block the bypass line.

25. A control valve instrumentality for a fluid motor, characterized by a body having (A) an inlet for pressure fluid;

(B) a service port which may be connected to a fluid motor;

(C) an exhaust outlet;

(D) first passage means communicating the inlet and the service port;

(E) second passage means communicating the service port with the outlet;

(F) a supply check valve in the body biased to a normally closed position blocking said first passage means, but capable of being moved to an open position in response to the pressure [of] *which* fluid at said inlet [;] *exerts upon a portion of the supply check valve;*

(G) an exhaust check valve in the body biased to a normally closed position blocking said second passage means, but capable of being moved to an open position in response to the pressure of fluid at said service port;

(H) chambers in which said supply and exhaust check valves are movably received;

(I) means in the chamber for the exhaust check valve defining a piston that is operatively connected with the exhaust check valve and which is operable in response to the admittance of pressure fluid into said last mentioned chamber to hold the exhaust check valve in its closed position, against the opening forces which pressure fluid at the service port exert thereon;

(J) and means defining an inlet for said last mentioned chamber, through which pressure fluid can be admitted thereinto.

26. The control instrumentality of claim 25, further characterized by:

(A) means in the chamber for the supply check valve defining a piston which is operatively connected with the supply check valve *but movable relative thereto,* and which is [operable] *actuatable* in response to the admittance of pressure fluid into its chamber *in the direction* to hold the supply check valve in its closed position, against the opening forces which pressure fluid at said inlet exert thereon;

(B) and means defining an inlet for said last designated chamber, through which pressure fluid can be admitted thereinto.

27. A control instrumentality for a fluid motor, characterized by a body having an inlet port, an exhaust outlet, a service port, and passage means by which the inlet port is communicable with the service port and the latter is communicable with the exhaust outlet, and further characterized by:

(A) a pair of chambers in the body;

(B) a normally closed check valve in each chamber, (1) one of which check valves provides a supply valve arranged to normally close off communication between the inlet and the service port and adapted to be moved in one direction in its chamber to an open position establishing communication between the inlet and the service port in response to the pressure of fluid at the inlet, (2) and the other of which check valves provides an exhaust valve arranged to normally close off communication between the service port and the outlet and adapted to be moved in one direction in its chamber to an open position establishing communication between the service port and the outlet in response to the pressure of fluid at the service port;

(C) a piston in the chamber containing the exhaust valve, movable in opposite directions between defined limits at one of which it engages the exhaust valve and holds it closed;

(D) means defining an inlet to said exhaust valve chamber at the side of the piston remote from the exhaust valve, through which pressure fluid may be delivered to the exhaust valve chamber to render the piston effective to hold the exhaust valve closed;

(E) and a spring confined between the exhaust valve and its piston to yieldingly bias the same apart, said spring providing closing bias on the exhaust valve when the piston is in its other limit of movement.

28. The control instrumentality of claim 27, further characterized by the following:

(A) the exhaust valve is hollow and has a cylindrical skirt thereon which is slidably received in its chamber;

(B) a port in the exhaust valve communicates its hollow interior with the service port and allows pressure fluid returning to the service port from a motor that may be connected thereto to flow into the hollow interior of the exhaust valve;

(C) the piston for the exhaust valve has a passageway therethrough to communicate the hollow interior of the exhaust valve with the inlet of the exhaust valve chamber;

(D) and a check valve in said last named passageway permits fluid to flow from the hollow interior of the exhaust check valve to the inlet of its chamber but blocks reversal of such flow.

29. A control instrumentality for a reversible fluid motor, characterized by a body having:

(A) an inlet port to admit pressure fluid from a source thereof;

(B) a pair of service ports providing for connection of the instrumentality with the ports of a reversible fluid motor;

(C) an exhaust outlet;

(D) a first pair of passages, one for each service port and connecting the same with the inlet port;

(E) a second pair of passages, one for each service port and connecting the same with the exhaust outlet;

(F) a pair of fluid pressure actuatable supply check valves, one for each of the passages of said first pair thereof, movable toward and from normally closed positions blocking their respective passages, and capable of being opened in consequence of the flow of pressure fluid into the inlet port;

(G) a pair of fluid pressure actuatable exhaust check valves, one for each of the passages of said second pair thereof, movable toward and from normally closed positions blocking their respective passages, and capable of being opened in consequence of return flow of pressure fluid into the service ports;

(H) and fluid pressure responsive actuating means connected with each of said valves, and operable to hold the same closed.

30. A control instrumentality for a fluid motor, characterized by a body having:

(A) an inlet passage to admit pressure fluid from a source thereof;

(B) an outlet passage;

(C) a pair of service passages symmetrically arranged at opposite sides of and spaced from said inlet and outlet passages;

(D) a supply passage connected with said inlet passage, and having (1) opposite branches extending outwardly in opposite directions therefrom to said service passages, (2) and communicating with the latter through coaxial outwardly facing annular valve seats;

(E) an exhaust passage connected with said outlet passage and having (1) opposite branches extending outwardly in opposite directions therefrom toward the service passages, (2) and communicating with the latter through coaxial outwardly facing annular valve seats;

(F) a chamber outwardly of and coaxial with each valve seat, and opening thereto, each chamber having an inlet remote from its valve seat, through which pressure fluid may be admitted to the chamber;

(G) and a valve mechanism in each chamber, comprising (1) a valve member yieldingly biased into engagement with the associated valve seat, (2) and a fluid pressure responsive actuator in each chamber, operable to hold its associated valve member on its seat in response to the admittance of pressure fluid into its chamber.

31. Control valve means for a fluid motor, comprising:

(A) a control instrumentality having (1) a supply passage through which pressure fluid must flow on its way to a motor governed by the control valve means, (2) an exhaust passage through which return fluid must flow when fluid exhausts from a fluid motor governed by the control valve means, (3) a supply valve mechanism normally closing the supply passage but capable of being moved to an open position in consequence of the forces which pressure fluid in the supply passage upstream from the supply valve mechanism exert [thereon,] *upon a portion thereof,*

(4) and an exhaust valve mechanism normally closing the exhaust passage but capable of being moved to an open position in consequence of the forces exerted thereon by pressure fluid exhausting from a motor governed by the control valve means;

(B) and a pilot valve mechanism connected with said exhaust valve mechanism to control opening thereof.

32. The control valve means of claim 31, wherein said pilot valve mechanism is also connected with the supply valve mechanism to control opening thereof.

33. A control valve instrumentality for a fluid motor, characterized by a body having an inlet for pressure fluid, an exhaust outlet, and a service port from which pressure fluid entering the inlet can flow to the motor and through which return fluid exhausting from the motor can flow to the outlet, further characterized by:

(A) passage means in the body defining (1) a first flow path leading from the inlet to the service port, (2) and a second flow path leading from the service port to the outlet, (B) a pressure responsive supply valve mechanism in the body normally blocking said first flow path but capable of being moved to an open position in response to the *direct action of* pressure of fluid in the inlet portion of said first flow path [;] *upon a surface on the supply valve mechanism;*

(C) a pressure responsive exhaust valve mechanism in the body movable to an open position from a closed position blocking said second flow path;

(D) means comprising a first surface on said exhaust valve mechanism located in said passage means to be acted upon by return fluid entering the service port to provide for opening of the exhaust valve mechanism in consequence of the force which return fluid exerts upon said first surface;

(E) and means comprising other surfaces on said exhaust valve mechanism upon which fluid under pressure from a source thereof externally of the valve body can exert force to hold the exhaust valve mechanism closed despite its tendency to open in response to the fluid pressure forces exerted upon said first surface thereof.

34. The control valve instrumentality of claim 33, further characterized by the following:

(A) that the body has a chamber in which the exhaust valve mechanism is movably mounted with said other surfaces thereof accessible from the interior of the chamber;

(B) and that the body has a port therein opening to said chamber to provide for the admittance thereto of pressure fluid necessary to hold the exhaust valve mechanism closed.

35. The control valve instrumentality of claim 34, wherein: the exhaust valve mechanism has a restricted passage therein to communicate that portion of said passage means which is adjacent to the supply valve with the interior of said chamber; and means in said chamber providing for limited unidirectional fluid flow from said portion of the passage means through said restricted passage and out said port.

36. A control valve instrumentality for a reversible fluid motor, characterized by a valve body having an inlet for pressure fluid, an exhaust outlet, and a pair of service ports to connect with the ports of a reversible fluid motor, and further characterized by:

(A) supply passages, one for each service port and leading therefrom to the inlet through an annular supply valve seat;

(B) return passages, one for each service port and leading therefrom to the outlet through an annular return valve seat;

(C) pressure chambers in the body, one for each of said valve seats;

(D) a pressure responsive valve mechanism in each of said pressure chambers;

(E) a first pair of said valve mechanisms constituting supply valve mechanisms which are cooperable with said supply seats to control fluid flow from the inlet to each service port, and each having (1) a first surface upon which pressure fluid in the inlet portion of its supply passage can act to effect opening of the supply valve mechanism, and (2) a second surface larger in area than said first surface upon which pressure fluid in its chamber can act to prevent opening of the supply valve mechanism;

(F) a second pair of said valve mechanisms constituting exhaust valve mechanisms which are cooperable with said exhaust seats to control fluid flow from each service port to the outlet, and each having (1) a first surface upon which the pressure of fluid at its service port can act to effect opening of the exhaust valve mechanism, and (2) a second surface larger in area than said first surface thereof, upon which pressure fluid in its pressure chamber can act to prevent opening of the exhaust valve mechanism;

(G) and means providing an inlet to each of said chambers to enable pressure fluid to be supplied thereto and exhausted therefrom.

37. The control valve instrumentality of claim 36, further characterized by:

(A) restricted passages in each of said exhaust valve mechanisms that provide said inlets to the chambers of the exhaust valve mechanisms and communicate said last named chambers with those portions of the supply passages that are downstream from the supply valve seats;

(B) and a third surface on each of said exhaust valve mechanisms upon which return fluid in the outlet portion of its return passage can act to effect opening of the exhaust valve mechanism at times when the pressure of fluid in said outlet portion of its return passage exceeds the pressure of fluid at its service port.

*38. In a fluid pressure operated system having a pressure fluid source:*

*(A) conduit means connecting with the source and providing a supply line through which source fluid can flow to a point of use;*

*(B) means defining a pair of bypass ducts each connecting with the supply line,*

*(1) one of said ducts providing a large capacity bypass line through which pressure fluid from the source can be exhausted in bypass relation to the supply line,*

*(2) and the other of said ducts providing a small capacity control line through which source fluid can also be exhausted in bypass relation to the supply line;*

*(C) a first fluid pressure actuatable instrumentality to control fluid flow through the main bypass and supply lines, said instrumentality comprising a valve*

*mechanism associated with the main bypass line and adapted for pressure produced actuation from a bypass open to a bypass closed position to compel source fluid to flow through the supply line;*

*(D) a second fluid pressure actuatable instrumentality;*

*(E) a pilot mechanism having a valve element to govern fluid flow through said control line, which valve element is movable from a first position providing for free flow of source fluid through the control line to a second position blocking fluid flow through the control line to cause pressure to be built up therein;*

*(F) and means for simultaneously directing such pressurized fluid in the control line to both of said instrumentalities.*

*39. In a fluid pressure operated system having a pressure fluid source:*

*(A) conduit means connecting with the source and providing a supply line through which source fluid can flow to a point of use;*

*(B) means defining a pair of bypass ducts each connecting with the supply line,*

*(1) one of said ducts providing a large capacity bypass line through which pressure fluid from the source can be exhausted in bypass relation to the supply line,*

*(2) and the other of said ducts providing a small capacity control line through which source fluid can also be exhausted in bypass relation to the supply line;*

*(C) a first fluid pressure actuatable instrumentality to control fluid flow through the main bypass and supply lines, said instrumentality comprising a valve mechanism associated with the main bypass line and adapted for pressure produced actuation from a bypass open to a bypass closed position to compel source fluid to flow through the supply line;*

*(D) a second fluid pressure actuatable instrumentality;*

*(E) a pilot mechanism having a valve element to govern fluid flow through said control line, which valve element is movable from a first position providing for free flow of source fluid through the control line to a second position blocking fluid flow through the control line to cause back pressure to be built up therein;*

*(F) and means for imposing such back pressure upon both of said instrumentalities to effect pressure produced actuation of said valve mechanism and closure of the main bypass line concurrently with actuation of said second instrumentality.*

*40. In a fluid pressure operated system having a pressure fluid source:*

*(A) means providing a first duct connecting with the source;*

*(B) means providing a bypass duct connecting with the source and through which source fluid can be exhausted in bypass relation to the first duct;*

*(C) a first fluid pressure actuatable instrumentality cooperable with said bypass and first ducts to control fluid flow therethrough, said instrumentality comprising a bypass valve mechanism which is adapted for pressure produced actuation from a bypass open to a bypass closed position to compel flow of source fluid through said first duct;*

*(D) a second fluid pressure actuatable instrumentality;*

*(E) and a pilot valve having*

*(1) exhaust outlet means,*

*(2) an inlet port normally communicating with the outlet means and connected with said valve mechanism and with the pressure fluid source to receive control fluid therefrom,*

*(3) a control port operatively connected with said second instrumentality and communicable with the inlet port,*

*(4) and a valve element which is movable to a position communicating the control port with the inlet port and closing off the latter from the exhaust outlet means to thus simultaneously direct control fluid to said second fluid pressure actuatable instrumentality and to said bypass valve mechanism to effect pressure produced closure of the latter.*

*41. The fluid pressure operated system of claim 40, further characterized by the following:*

*(A) that said first duct provides a pressure fluid supply line;*

*(B) by another duct that provides a pressure fluid return line;*

*(C) and that said second fluid pressure actuatable instrumentality comprises another valve mechanism that is adapted to control fluid flow through said return line in accordance with the position of the valve element of the pilot valve.*

*42. In a fluid pressure operated system including a pump, a reservoir, and a fluid motor:*

*(A) conduit means connecting the motor with the pump and with the reservoir and providing main supply and return lines through which pressure fluid can flow to and from the motor;*

*(B) means defining a pair of ducts each communicating the main supply line with the reservoir, one of said ducts providing a large capacity bypass line through which pump output fluid can bypass the main supply line and be returned to the reservoir, and the other duct providing a small capacity control line through which only a small proportion of the pump output can flow to the reservoir;*

*(C) a first fluid pressure actuatable valve mechanism to control said bypass line and adapted for pressure produced actuation from a bypass open to a bypass closed position to compel pump output fluid to flow through the main supply line;*

*(D) a second fluid pressure actuatable valve mechanism to control fluid flow through said return line;*

*(E) a master control valve governing fluid flow through said control line, and having a valve element that normally occupies an open position providing for free flow of pump fluid through said control line, but which valve element is movable out of said normal position to close said control line and thus cause back pressure to be built up in the pump side of the control line;*

*(F) and means for imposing such back pressure upon both of said first and second fluid pressure actuatable valve mechanisms to effect pressure produced actuation of the first valve mechanism and closure of the bypass line concurrently with actuation of said second valve mechanism.*

*43. In a fluid pressure operated system including a pump, a reservoir, and a fluid motor:*

*(A) conduit means connecting the motor with the pump and with the reservoir and providing main supply and return lines through which pressure fluid can flow to and from the motor;*

*(B) conduit means defining a large capacity bypass line to connect the pump with the reservoir in bypass relation to the main supply line;*

*(C) means defining a small capacity control duct to similarly connect the pump with the reservoir in bypass relation to the main supply line;*

*(D) a pair of fluid pressure responsive valve mechanisms, one to govern the bypass line and the other to govern the return line, and each having*

*(1) a pressure chamber,*

*(2) and a normally closed valve member in the chamber, adapted to be opened in response to force exerted thereon by pressure fluid in its associated line at times when its chamber is vented and to be moved toward open position an ex-*

*tent depending upon the degree to which the chamber is vented;*

*(E) and a pilot mechanism to control said pressure responsive valve mechanisms, said pilot mechanism having*

*(1) a passage through which fluid in the control duct must flow to reach the reservoir, and the inlet of which passage is connected with the bypass valve chamber so that the pressure of fluid therein is determined by the pressure at the passage inlet,*

*(2) a control port connecting with the return valve chamber,*

*(3) exhaust outlet means with which said control port is communicable,*

*(4) and a movable valve element to govern the extent to which the control port is vented to the exhaust outlet means and to adjustably restrict said passage to thus control the extent to which the bypass valve chamber is vented.*

*44. In a fluid pressure operated system including a pump, a reservoir, and a fluid motor:*

*(A) conduit means connecting the motor with the pump and with the reservoir and providing main supply and return lines through which pressure fluid can flow to and from the motor;*

*(B) conduit means defining a large capacity bypass line to connect the pump with the reservoir in bypass relation to the main supply line;*

*(C) means defining a small capacity control duct to similarly connect the pump with the reservoir in bypass relation to the main supply line;*

*(D) a pair of fluid pressure responsive valve mechanisms, one to govern the bypass line and the other to govern the return line, and each having*

*(1) a pressure chamber,*

*(2) and a valve member in the chamber, adapted to be opened in response to force exerted thereon by pressure fluid in its associated line at times when its chamber is vented, the return valve member being adapted to be moved toward open position an extent depending upon the degree to which its chamber is vented;*

*(E) and a pilot mechanism to control said valve mechanisms, said pilot mechanism having*

*(1) a passage through which fluid in the control duct must flow to reach the reservoir, and the inlet of which passage is connected with the bypass valve chamber,*

*(2) a control port connecting with the return valve chamber,*

*(3) exhaust outlet means with which the control port is communicable,*

*(4) and a movable valve element by which said passage can be closed to divert pressure fluid in the control duct to the chamber of the bypass valve to cause closure thereof, said valve element being operable to govern the extent to which the control port is vented to the exhaust outlet means to thereby control the extent to which the return valve is opened in consequence of force exerted thereon by pressure fluid in the return line.*

*45. In a fluid pressure operated system including a pump, a reservoir, and a fluid motor:*

*(A) conduit means connecting the pump with the motor and providing a main supply line in which pressure fluid can flow to the motor;*

*(B) means defining a pair of ducts each connecting the main supply line with the reservoir, one of said ducts providing a bypass through which pump output fluid can bypass the main supply line and be returned to the reservoir, and the other duct providing a control line through which only a small proportion of the pump output can flow to the reservoir;*

*(C) a fluid pressure responsive bypass valve to govern flow through said bypass line, having a portion upon which pump output fluid exerts force tending to move the bypass valve to a fully open position;*

*(D) a control valve for said control line, having a valve element to govern fluid flow therethrough, said valve element being movable from an open position providing free flow of pump output fluid through said control line, to a closed position preventing such flow, through a number of intermediate throttling positions adjustably restricting fluid flow through said control line to cause varying degrees of back pressure to be built up in the pump side thereof;*

*(E) means by which back pressure in the pump side of said control line is imposed upon another portion of the bypass valve in opposition to said opening force which pump output fluid imposes thereon, and by which the bypass valve can be moved toward a bypass closing position an extent determined by the magnitude of the back pressure built up in the pump side of said control line by the valve element of the control valve;*

*(F) means providing an exhaust duct connecting the motor with the reservoir;*

*(G) means providing a normally closed check valve for the main supply line arranged to open to permit pump output fluid to flow through the main supply line to the motor but to prevent reverse fluid flow;*

*(H) means providing a normally closed check valve for the exhaust duct arranged to open to permit fluid exhausting from the motor to flow through said exhaust duct to the reservoir but to prevent fluid in the main supply line from flowing through the exhaust duct to the reservoir;*

*(I) and fluid pressure operated means governed by the valve element of said control valve, for holding said exhaust check valve closed in response to the pressure of fluid in the control valve obtaining as a consequence of movement of said valve element to a position effecting restriction of fluid flow through said bypass.*

References Cited by the Examiner

The following references, cited by the Examiner, are of record in the patent file of this patent or the original patent.

UNITED STATES PATENTS

| | | | |
|---|---|---|---|
| 1,905,132 | 4/1933 | Bishop et al. | 60—52 |
| 2,267,177 | 12/1941 | Twyman | 60—52 |
| 2,303,946 | 12/1942 | Miller | 60—52 |
| 2,489,435 | 11/1949 | Robinson | 60—52 X |
| 2,618,121 | 11/1952 | Tucker | 60—52 |
| 2,984,985 | 5/1961 | MacMillin | 60—97 |

FOREIGN PATENTS

| | | |
|---|---|---|
| 1,129,777 | 9/1956 | France. |
| 842,065 | 7/1960 | Great Britain. |

EDGAR W. GEOGHEGAN, *Primary Examiner.*